(12) United States Patent
Jensen et al.

(10) Patent No.: US 7,545,797 B2
(45) Date of Patent: Jun. 9, 2009

(54) PARTIALLY INTERCONNECTED TOPOLOGICAL NETWORK

(75) Inventors: Bruce Jensen, Wimborne (GB); Peter Bladon, Wotton-under-Edge (GB); Thomas S Maddern, Wimborne (GB); Geoffrey Chopping, Wimborne (GB)

(73) Assignee: Ericsson AB, Stockholm (SE)

( * ) Notice: Subject to any disclaimer, the term of this patent is extended or adjusted under 35 U.S.C. 154(b) by 828 days.

(21) Appl. No.: 10/275,185

(22) PCT Filed: May 3, 2001

(86) PCT No.: PCT/GB01/01952

§ 371 (c)(1),
(2), (4) Date: Apr. 8, 2003

(87) PCT Pub. No.: WO01/84877

PCT Pub. Date: Nov. 8, 2001

(65) Prior Publication Data

US 2003/0198213 A1    Oct. 23, 2003

(51) Int. Cl.
*H04L 12/28* (2006.01)
*H04L 12/56* (2006.01)
(52) U.S. Cl. .................... 370/351; 370/400
(58) Field of Classification Search ............. 370/351, 370/348, 443, 444, 455, 406, 400
See application file for complete search history.

(56) References Cited

U.S. PATENT DOCUMENTS

| | | | |
|---|---|---|---|
| 6,178,169 B1 * | 1/2001 | Hodgkinson et al. ... | 370/395.52 |
| 6,339,488 B1 * | 1/2002 | Beshai et al. .................. | 398/59 |
| 6,363,062 B1 * | 3/2002 | Aaronson et al. ........... | 370/348 |
| 6,614,762 B1 * | 9/2003 | Illiadis et al. ............... | 370/252 |
| 6,728,484 B1 * | 4/2004 | Ghani ......................... | 398/42 |
| 7,042,846 B2 * | 5/2006 | Bauer ......................... | 370/238 |

FOREIGN PATENT DOCUMENTS

EP    0 849 975 A2    6/1998

OTHER PUBLICATIONS

Alternative Routing Methods for PNNI Networks with Partially Disjoint Paths, Sydney, Nov. 8-12, 1998, New York, NY, IEEE, US, Nov. 8, 1998, pp. 621-626.

* cited by examiner

*Primary Examiner*—Chirag G Shah
*Assistant Examiner*—Blanche Wong
(74) *Attorney, Agent, or Firm*—Kirschstein, et al.

(57) ABSTRACT

In a partially interconnected topological network having at least six topological nodes, a topological node being a single physical node or a group of interconnected physical nodes or part of a physical node or a group of interconnected physical nodes and parts of physical nodes, each topological node having at least three point-to-point topological links connecting it to some, but not all, of the plurality of topological nodes, there is at least one choice of routing between any two topological nodes, where the choice of routing is either two point-to-point topological links connected in series at another of the topological nodes or a direct point-to-point topological link between the two topological nodes.

16 Claims, 26 Drawing Sheets

16 Nodes

Single - One Link Connections to 6 Nodes
and Twin - Two Link Connections to all Nodes

FIGURE 11

15 Nodes

Single – One Link Connections to 8 Nodes
and Quad – Two Link Connections to all Nodes

Figure 13

9 Nodes

Single - One Link Connections to 4 Nodes
Single - Two Link Connections to same 4 Nodes
and Twin - Two Link Connections to other 4 Nodes

| NODES | 1 | 2 | 3 | 4 | 5 | 6 | 7 | 8 | 9 | 10 | 11 |
|---|---|---|---|---|---|---|---|---|---|---|---|
| 1  |   | 1 |   | 1 |   |   | 1 |   |   |    | 1  |
| 2  | 1 |   | 1 |   |   | 1 |   |   |   | 1  | 1  |
| 3  |   | 1 |   |   | 1 |   |   |   | 1 | 1  | 1  |
| 4  | 1 |   |   |   |   |   |   |   | 1 | 1  | 1  |
| 5  |   |   | 1 |   |   |   |   | 1 | 1 | 1  | 1  |
| 6  |   | 1 |   |   |   |   |   | 1 | 1 |    | 1  |
| 7  | 1 |   |   |   | 1 | 1 |   |   | 1 |    |    |
| 8  |   |   |   | 1 | 1 | 1 |   |   |   |    | 1  |
| 9  |   |   | 1 | 1 | 1 |   | 1 |   |   | 1  |    |
| 10 |   | 1 | 1 | 1 |   | 1 |   |   | 1 |    |    |
| 11 | 1 | 1 | 1 |   | 1 |   |   | 1 |   |    |    |

PARTIALLY INTERCONNECTED TOPOLOGICAL NETWORK

BACKGROUND OF THE INVENTION

The role of network design in providing Quality of Service (QoS) is often overlooked: a poorly designed network architecture will never, regardless of the sophistication of the bandwidth allocation strategy used, be able to match the performance of a well designed network. Below is shown a type of network that overcomes many of the problems associated with conventional network designs. These networks have bounded hop counts, relatively few links and an even distribution of routes across the network. Even route distribution allows path selection (i.e. routing) algorithms to evenly load traffic onto the network, preventing network hotspots that degrade performance; an even load distribution improves the networks response to failure. Consequently, these regular partially-meshed networks have exceptional performance. Firstly, existing strategies for designing networks, and their problems, are analysed.

Problems of Network Design

Communications networks are very complex systems. They consist of many physical and logical layers, built from many different technologies. A network can be viewed as wholly physical (e.g. a Synchronous Digital Hierarchy (SDH) transport network built of duct, fibre and switching equipment), part physical, part logical (e.g. a set of Asynchronous Transfer Mode (ATM) or Internet Protocol (IP) switches built from logical links provided by a transmission/transport network) or wholly logical (e.g. the logical nodes and links of an ATM Private Network-Network Interface (PNNI) hierarchy). In this many-layered structure, each layer will need a different network design, (which should ideally take into account higher and lower level layers), to account for differing design objectives, constraints and technological limitations. The use of various transmission arrangements is possible when carrying a point-to-point topological link. For example such a link can be the whole or just part of a transmission system, several transmission systems in series, or a combination of such arrangements. A point-to-point topological link may also itself carry many circuits or packet streams which are multiplexed together.

In any real network traffic must enter and exit the network at various topological nodes. This should be assumed to apply for the various configurations, although it may not be specifically mentioned.

There may be cases where some constraint imposes that a combination of topological structures may be combined to form a larger network, in which case only part of an overall network may consist of a regular partially-meshed network. Similarly, an overall network may contain more than one instance of a regular partially-meshed network.

Concentration is on the topological aspects of network design and not focussed on any particular implementation technology, though it is anticipated that the designs will find more application at the service layers of a network (IP/ATM/Public Switched Telephone Network (PSTN)) rather than at the transport layer. The network is therefore designed as a topological arrangement of nodes and links that provides connectivity between all pairs of nodes.

Ring and mesh networks are a good starting point for a discussion of network design, since they illustrate the trade-offs inherent in all networks. Suppose a network is required to carry a constant amount of traffic C between all pairs N of nodes. If every node is connected to every other node, the result is a fully-meshed network as shown in FIG. 1a, which has of order $N^2$ links (i.e. $N(N-1)/2$ links). Each of the $N(N-1)$ streams of traffic is switched twice, once at the originating node, and once at the destination node. Each stream of traffic has one hop between source and destination (where a hop is defined as the number of links traversed). An alternative is to connect all nodes into a ring using N links as shown in FIG. 1b. Traffic between non-adjacent nodes has to be switched by intervening nodes and the average number of hops per traffic stream is proportional to N. More traffic carrying capacity has to be provided by the nodes and links to carry this transit traffic. The total transit traffic in a ring network scales as $N^3$, for N even, the transit traffic is $CN(N/2-1)^2$, for N odd it is $CN((N+1)/2-1)((N+1)/2-2)$ Which of these two is better? The fully-meshed network makes efficient use of its nodes: no capacity is used switching transit traffic. However, too many links are used to achieve this objective; the number of links grows so fast with N, that meshes are only practical for small networks. If network ports are a limited resource, then the maximum number of nodes in a network (and hence its capacity) is limited by the number of ports. Is the ring network any better? In a ring network, network size is not limited by the number of ports, but, as the size of the network increases, more and more capacity has to be devoted to carrying transit traffic. In both cases the designs do not scale well: a ring has too many hops; a filly-meshed network has too many links.

Networks with better scaling properties can be designed by adding links selectively between nodes to form a 'Random Partial Mesh' as shown in FIG. 2 with nine nodes. Typically each node will be connected to at least two other nodes to ensure the network survives a link failure, and it is ensured that no single node failure can split the network into two pieces. As we shall see, a random partial-mesh represents, at least in some respects, a good compromise between ring and mesh networks. In particular performance and cost can be traded by altering the degree of meshing.

Designing networks from scratch to meet specific objectives, such as cost and performance is intrinsically difficult: the optimisation problem is NP-complete. That is, no algorithm exists to find an optimum solution in polynomial time. Many techniques, such as simulated annealing or genetic algorithms, can be used to find sub-optimal, but useful, solutions, and some design tools incorporate these algorithms or other heuristics. However, the major problem with these approaches is that the quality of the design can only ever be as good as the optimisation criteria used. Choosing practical optimisation criteria is in itself a difficult problem. Some constraints may find expression in a cost function, but adequate solutions may not be found because of inadequacies in the search algorithms.

Analysing the performance of a randomly-meshed network is difficult due to its irregularity. It is a problem best tackled by a computer. Analysis of the routes in a randomly-meshed network (which routes are a function of the topology of the network) almost always shows that some nodes act as 'hubs', concentrating many short routes (of length two or three hops). In consequence, the hub nodes and surrounding links will, when loaded using almost any routing protocol, become more highly utilised, since every routing protocol will utilise shorter routes first. In other words the network will develop hot spots, not as a result of asymmetric traffic, but because of the network topology. This need not represent a problem, provided the network is dimensioned to support the asymmetric traffic. However, the consequences of node or link failure can be serious, particularly when a hub node or attached link fails.

Regular Partially-Meshed Networks

Scalability and hub problems can be overcome if partially meshed, regular networks (Regular Partial-Meshes) can be found. If the network is regular, the network looks the same from every node, hence no node can act as a hub. The scalability problem can be solved (or controlled, at least) by ensuring that there is a full set of two-hop routes between all nodes. Consider a partially connected network of N nodes, which contains N switching elements (which need not be the nodes themselves). If each node is connected to of order $N^{1/2}$ switching elements, then $N^{1/2}$ different destinations can be reached in one hop. If the switching element is itself connected to $N^{1/2}$ other nodes, then all $N^{3/2}$ nodes can be reached in two hops. The network therefore has a total of order $N^{3/2}$ links, far fewer than the $N^2$ links of the fully connected network. (If N=100, $N^{3/2}$=1000, $N^2$=10000). Since all traffic is switched one extra time (a total now of three times), only 50% extra switching capacity needs to be deployed.

Finding partially connected networks is not an easy task. Mathematically it consists of finding a connectivity matrix with specific properties. Let A denote a v⊗b connectivity matrix that enumerates the connections between v network nodes and b other switching elements. The component $a_{ij}$ of matrix A is the number of links between the i th node and the j th switching element. Matrix A therefore describes the number of one-hop routes between each pair of nodes and switching elements. The number of routes with two hops between node i and node j is given by the number of routes between i and an intermediate switching element k, $a_{ik}$, times the number of routes from the switching element k to node j, $a_{kj}$, summed over all intermediate elements. We denote this matrix B and its elements $b_{kj}$. That is $$b_{ij} = \sum_k a_{ik} a_{kj}.$$

This is just the product of matrix A with itself, so that $B=AA^T$. The two-hop property we want to enforce, along with regularity, is:

$$B = AA^T = \begin{pmatrix} r & \lambda & \cdots & \lambda \\ \lambda & r & & \cdot \\ \cdot & & \cdot & \cdot \\ \cdot & & & \cdot \\ \lambda & \cdots & \cdots & r \end{pmatrix} = (r-\lambda)I + \lambda J \quad (1)$$

where I is the v×v identity matrix, and J is a v×v matrix of ones. Equation (1) is a particular representation of a Balanced Incomplete Block Design (BIBD), if there are exactly k ones in each column of A (i.e. each switching element is connected to exactly k nodes) [1,2]. BIBD's were first used in statistical experiment design by Ronald Fisher in the 1920's. They have since found many other uses, in tournament design, coding and cryptography, but not, until now, network design. In the combinatorics literature, BIBD's are often denoted BIBD(v, b,r,k), or since b and r can be determined from other parameters, as 2–(v,kλ) designs, or as simply (v,kλ) designs.

There are many ways of applying BIBD's in communication networks. To make the network more resilient, λ>1, so that there is more than one choice of route between any two nodes. Each of these λ choices is diverse—the routes share no common node or link—since each route must traverse a different switching element. If one route becomes unavailable, for any reason, there is always at least one other route that can be used.

Two Tier Applications: Stars and Areas

The most general application of BIBD's is to consider the b switching elements as a separate switching layer. These switches do not constitute a conventional trunk or higher tier network, as they are not directly connected together. The terms 'Star node' and 'Area node' are used to distinguish the b switching elements that transit traffic from the v nodes that sink and source traffic. All BIBD's can be used for this type of application, since it imposes no symmetry constraints on the BIBD. In particular, v is not equal to b, and the matrix A does not have to be symmetric, i.e. $a_{ij}$ is not equal to $a_{ji}$.

An example is an asymmetric (7,4,2) design with v=b. The matrix A describing the connectivity between area nodes 1-7 and star nodes A-G is shown in FIG. 3, together with a sketch of the network.

There are many extensions of this concept: area nodes can be generalised to include many separate edge nodes using a common set of star nodes, etc, etc. Examples of this type of application are discussed in reference [3].

Single Tier Applications

Using BIBD's in a single tier network, the connectivity matrix A must be symmetric, and v=b. A symmetric matrix should not be confused with a symmetric BIBD, which has a different mathematical definition. The diagonal of A must be zero otherwise nodes would contain non-trivial links to themselves. These constraints limit the number of suitable BIBD's. Taking a pragmatic view, one can allow many imperfections and still produce high quality networks. In particular, if the maxim is adopted that there are at least two choices of one or two hop routes between every pair of nodes $$a_{ij}+b_{ij}>1,$$

many good network designs that are not BIBD can be found. Of the many classes that have been found that fulfil this criteria, two are especially useful (i) symmetric BIBD's with the diagonal removed (this makes the network slightly irregular, but does not decrease network performance appreciably) and (ii) Strongly Regular Graphs. A Strongly Regular Graph with parameters (v,k,λ,μ) has v nodes without loops (i.e. links to itself—the diagonal is zero) or multiple links between nodes, and has k links to other nodes. The matrix B giving the all important two hop routes is $$B=kI+\mu A+\lambda(J-I-A) \quad (2)$$

where I is a v×v identity matrix, and J is a v×v matrix of ones, as before. Equation (2) says that there are λ choices of two hop routes almost everywhere except where there are direct links, where there are μ choices of two hop routes (as well as one direct route). The amount of extra connectivity is small, since of the $v^2$ total two-hop routes, only vk of them will have more than two choices, and k is proportional to $v^{1/2}$.

FIG. 4 shows a (9,4,1,2) Strongly Regular Graph, denoted $3^2$ in [2]. The structure of the (9,4,1,2) graph, consisting of 3 groups of nodes, each group consisting of a full-mesh of 3 nodes, each node being additionally connected to its partner in the other two groups, suggests many obvious extensions. Repeating the pattern with groups of four nodes gives the Strongly Regular Graph (16,6,2,2), which is also a (16,6,2) BIBD. Likewise the pattern can be extended ad infinitum, with 5 blocks of 5 nodes, etc, all of which are Strongly Regular Graphs. Forming patterns from, 6 groups of 5 nodes, etc, yields graphs which are not strongly regular, but nevertheless form excellent communications networks with diverse mostly two choice two-hop routes.

Performance Comparisons

Since no one performance metric can characterise a network, the relative performance of a set of networks have been compared across a range of measures. Since comparison with rings and meshes would reveal nothing new, randomly-meshed networks with 9,16,25 and 36 nodes were compared to partially meshed networks with the same numbers of nodes [4]. The partially-meshed networks chosen were the $3^2, 4^2, 5^2$ and $6^2$ Strongly Regular Graphs from reference [2]. Randomly meshed networks were generated using a commercial simulated-annealing network planning tool set up to use minimum hop routing on an even traffic distribution [5]. All networks were designed so that (at least) two diverse paths exist for every traffic demand. The number of links was controlled by penalising transit traffic. With no transit traffic penalty, the networks become ring like; upon increasing the transit traffic penalty the networks become more mesh-like.

When comparing any two networks, to reach any definite conclusions, assumptions must be made about traffic distribution and network behaviour (i.e. what sort of routing protocols are used). To make the conclusions as general as possible, it is assumed that traffic is routed using a minimum hop scheme, with routes of equal weight being equally utilised. This corresponds to OSPF equal-cost multi-path routing with link weights set to one, and is representative of many commonly used routing schemes [6]. The traffic was assumed to be uniformly distributed, with an arbitrary one unit of traffic demand between all node pairs. This simplifies analysis, but is also, when designing networks, the least biased traffic distribution to choose in the absence of any information about traffic distribution. The choice of traffic distribution does not affect the primary topological design issues considered.

Transit Traffic and its Distribution

Transit traffic, is a simple measure of network efficiency. For a uniform traffic distribution, the transit traffic distribution is representative of the route distribution across the network. FIGS. 5a and 5b show the transit traffic on each node and the traffic on each link for the randomly meshed and partially connected 9 node, 18 link networks respectively.

In the randomly meshed network, two nodes act as hubs, carrying far more transit traffic than other nodes (14 and 10 units respectively).

FIG. 6 shows the mean transit traffic per node, and the sum of mean transit traffic and its standard deviation, plotted as a function of the number of links for all networks. The mean transit traffic is comparable in randomly meshed and partially connected networks when the numbers of links is equal. This shows that the randomly meshed networks are as good as the partially meshed, using this measure of efficiency. However, the standard deviation of the transit traffic in the randomly meshed networks shows the traffic is unevenly distributed. For the regular networks, the standard deviation is zero; the traffic is perfectly distributed. Uneven traffic distribution is not a problem for a functioning network as individual links and nodes can be dimensioned accordingly, but it causes problems when links or nodes fail, since large amounts of transit traffic will need re-routing.

Node and Link Failure

In any network, nodes and links can always fail. The ability of a network to function with failed links or nodes is a vital component of its design. Consider the failure of the busiest link (shown dotted) in the nine node networks shown in FIG. 7. Traffic has been re-routed around the failure and the new node and link occupancies calculated. FIG. 7 shows them expressed as a multiplier of the load in the unfailed state.

Less spare capacity needs to be provided in the regular network to carry traffic in the failed state, as much less traffic needs re-routing, since the transit traffic is uniformly distributed. Plotted in FIG. 8 is the worst case increase in capacity of nodes and links that ensues when all nodes or links are failed, one at a time.

FIG. 8 can be used to determine the worst case planning limit that should be used on nodes and links to ensure no network congestion in failure. Some links in the randomly meshed networks can only be run at a maximum of 30% occupancy, whereas in the regular networks, this figure varies from 75% in the 9 node network, to 83% in the 36 node network. In the randomly meshed networks, planning limits must be determined for every node and link; for the regular mesh networks, they are constant across all nodes and links. FIG. 9 shows the total node and link capacity is required to support the given traffic load and survive all possible single point of failure scenarios as a fraction of the working node and link capacity. Actual deployed capacity is lower for the regular mesh networks with comparable numbers of links, and even for some networks with fewer links: making networks too sparse can often be a false economy.

Load Balancing and Uneven Traffic Distributions

Two objections might be raised to the analysis presented above: that the assumption of a uniform traffic distribution invalidates the results and that load balancing algorithms can mitigate the effects of poor network design.

The key advantage of the regular partially connected network designs is that the one and two hop routes upon which traffic is routed (and which most routing algorithms would utilise first) are evenly distributed across the network. Therefore a regular network will, almost regardless of the route selection algorithm, spread any traffic distribution as evenly as is possible across the network. Uneven transit traffic distribution (and the problem of hub nodes) is a function of network topology, not traffic distribution.

Load-balancing algorithms can improve the traffic distribution in the network. Using a simple load-balancing algorithm (to break ties on equal length routes, find the resource with the highest utilisation, choose the route with the lowest of the two) for both node and links showed that traffic could be balanced across the most highly utilised nodes or links. In effect, the two biggest hubs in the network were balanced. This is not surprising as many equal-length alternative routes traverse both hubs: these are the nodes or links that get balanced. For the regular networks, since node or link occupancies are more equal, node or link—balancing algorithms tend to balance load across all node or links. Load-balancing algorithms can improve network balance, but tend to work better on regular networks. Algorithms that try to guarantee quality of service (QoS) would also tend to work better on a regular network. QoS algorithms typically select a short path, check that the required service can be supported, and route the traffic accordingly. Only if the requested QoS cannot be guaranteed on this path (say due to resource exhaustion) will an alternative (longer) path be selected. This longer path will consume more network resources than a shorter path. If the point at which QoS algorithms choose longer paths can be delayed, by loading traffic more evenly on the network, then the final capacity of the network to route traffic with a given QoS will be higher.

Network design always involves a compromise between cost and performance; between rings and meshes. Among the near-infinite choices between these extremes are mathematically perfect or near-perfect regular partial mesh networks derived from BIBD's and strongly regular graphs. Such networks have natural traffic-balancing properties that make them preferable to random meshes of similar connectivity. It is advocated using these designs for their efficiency, robustness and regularity.

Following the analysis above, communications networks based on the suggested Balanced Incomplete Block Designs (BIBD's) and similar incidence matrices have many properties that make them especially suited for use in communications networks. The particular properties are:
1. All nodes are connected by routes of length maximum. 2
2. Multiple routes are provided that enhance load balancing and redundancy.

Networks and Topology

The topology of an arbitrary communication network can be represented as a Graph, which is an arrangement of Nodes (or Vertices) connected by Links (or Edges). A Node can represent a switching or routing element, or a logical aggregation of such elements. Links provide point-to-point connections between Nodes, and can represent physical connectivity (e.g. a fibre optic transmission system), logical connectivity (a virtual circuit, for instance) or a logical aggregate of such.

The topology of a network can also be represented by a connectivity matrix. If the Nodes in a network are labelled 1...N, the connectivity matrix is an ordered array of numbers with N rows and N columns, with the entry in the ith row and jth column representing the number of Links between the ith and jth Node. We denote the entire matrix by C, and the entry in row i column j by $c_{ij}$. An example is shown below.

$$C = \begin{pmatrix} 0 & 1 & 0 & 0 & 1 \\ 1 & 0 & 1 & 0 & 0 \\ 0 & 1 & 0 & 1 & 1 \\ 0 & 0 & 0 & 0 & 0 \\ 1 & 0 & 1 & 1 & 0 \end{pmatrix}$$

The transpose of matrix C is denoted $C^T$ and is defined by interchanging row and column indices:

$c^T_{ij} = c_{ji}$.

Multiplication of two matrices C and D to give E is denoted by:

E=CD and defined by the following operations on the components of each matrix:

$$e_{ij} = \sum_k c_{ik} d_{kj} = \sum_k c_{ik} d^T_{jk}$$

A Route across the network consists of a set of Nodes and Links traversed in order. The Length of the Route is defined to be the number of Links traversed. The number of Routes of Length 1 between Nodes i and j is given by the entry $c_{ij}$ in the connectivity matrix. The number of Routes of Length 2 between Nodes i and j is given by the number of Routes from Node i to any intermediate Node k multiplied by the number of routes from Node k to Node j. This set of numbers can be written as a matrix, which is called B.

$$b_{ij} = \sum_k c_{ik} c_{kj}$$

and $B = CC^T$

Balanced Incomplete Block Designs

A Balanced Incomplete Block Design (BIBD) is a concept that originates in combinatorial analysis. BIBD's solve the problem of arranging objects into a given number of sets under a certain set of restrictions. A formal description, taken from "Combinatorial Theory", Marshall Hall, (Blaisdell: Waltham Mass. 1967) is:

A balanced incomplete block design is an arrangement of v distinct objects into b blocks such that each block contains exactly k distinct objects, each object occurs in exactly r different blocks, and every pair of distinct objects $a_i$, $a_j$ occurs together in exactly $\lambda$ blocks.

A balanced incomplete block design can also be described by an incidence matrix. This is a matrix A with v rows and b columns, where, if $a_1, \ldots, a_v$ are the objects and $B_1, \ldots, B_b$ are the blocks, then $a_{ij}=1$, if $a_i \in B_j$ $a_{ij}=0$, if $a_i \notin B_j$ Then, a balanced incomplete block design will have the following properties—

$$AA^T = \begin{pmatrix} r & \lambda & \cdots & \lambda \\ \lambda & r & & \cdot \\ \cdot & & \cdot & \cdot \\ \cdot & & & \cdot \\ \lambda & \cdots & \cdots & r \end{pmatrix} = (r-\lambda)I_v + \lambda J_v I_v$$

where $I_v$ is the v times v identity matrix, and $J_v$ is a v times v matrix of ones. An additional constraint is there must be exactly k ones in each column of A.

Imperfect BIBD's

An Imperfect BIBD or Imperfect Network is defined as a BIBD wherein at least one Topological Node has a missing or extra Topological Link.

BIBD's and Networks

The incidence matrix A of a block design can be used to connect some or all of the Nodes in a Network. The key property is that a particular subset of connected Nodes have $\lambda$ Routes of Length at maximum 2 between all distinct Nodes of that subset. The connected Nodes in this subset will have the following properties:
1. Connectivity: All Nodes are connected by $\lambda$ Routes of Length 2. (They may also be connected by Routes of Length 1, and many longer Routes.)
2. Balancing: If $\lambda>1$, traffic may be balanced across the $\lambda$ different Routes available.
3. Resilience: If a Node or Link on a Route fails, $\lambda-1$ equivalent Routes can be used to carry the traffic.

It is the balancing and resilience properties, together with short Routes, that make these connectivity patterns so useful as networks.

SUMMARY OF THE INVENTION

According to the present invention there is provided a partially interconnected topological network comprising at least six Topological Nodes, each Topological Node having at least three point-to-point Topological Links connecting it to some but not all of the plurality of Topological Nodes and where there is at least one Choice of routing between any two Topological Nodes and where a Choice of routing comprises either two point-to-point Topological Links connected in series at another of the Topological Nodes or a direct point-to-point Topological Link between the two Topological Nodes.

BRIEF DESCRIPTION OF THE DRAWINGS

The present invention will now be described by way of example, with reference to the accompanying drawings, in which:—

Figure 11:
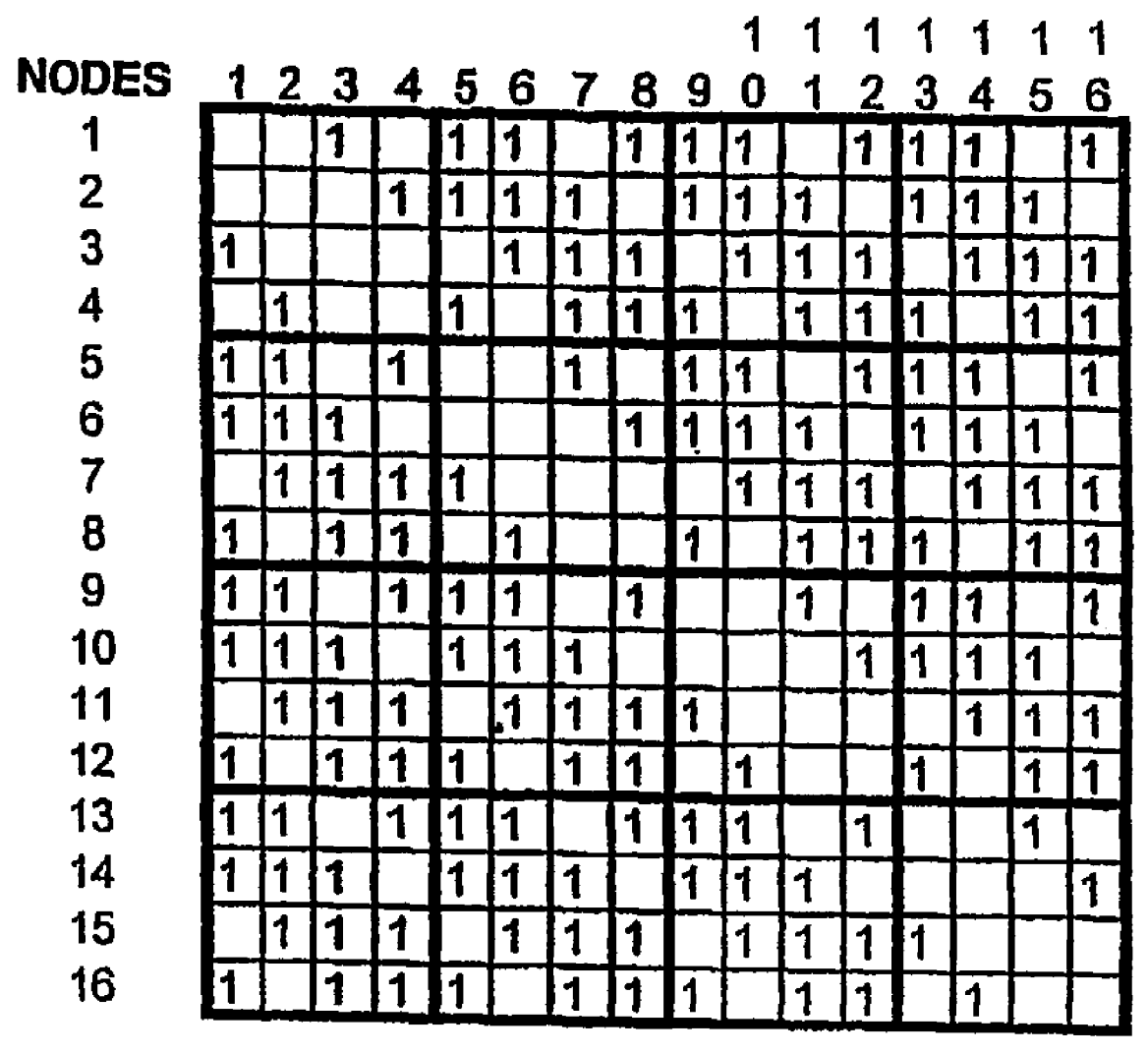

FIG. 11 shows the connection pattern (connectivity matrix) for a (16, 10, 6) BIBD;

Figure 13:
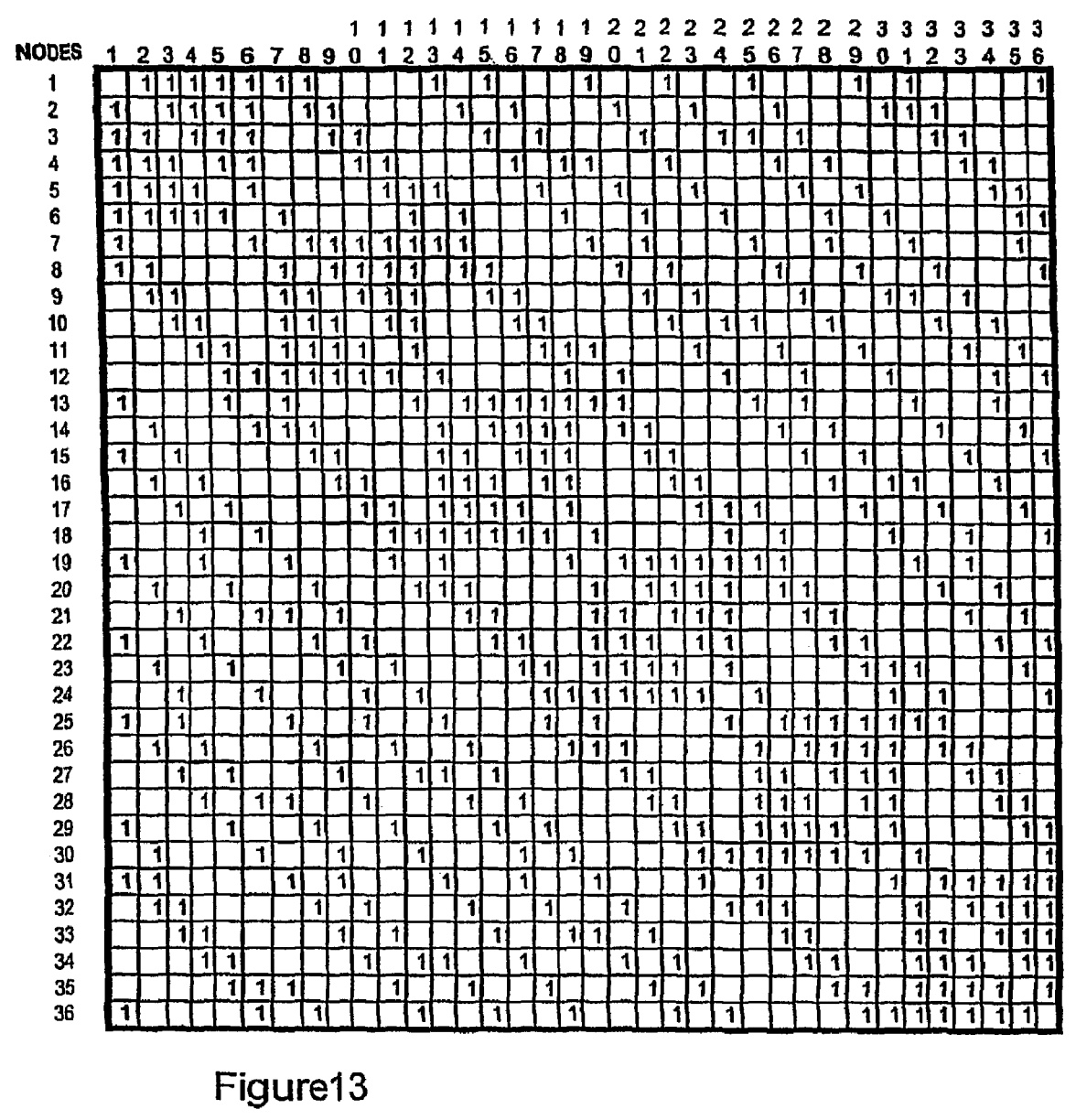

FIG. 13 shows the connection pattern for a (36, 14, 6) BIBD;

Figure 15:
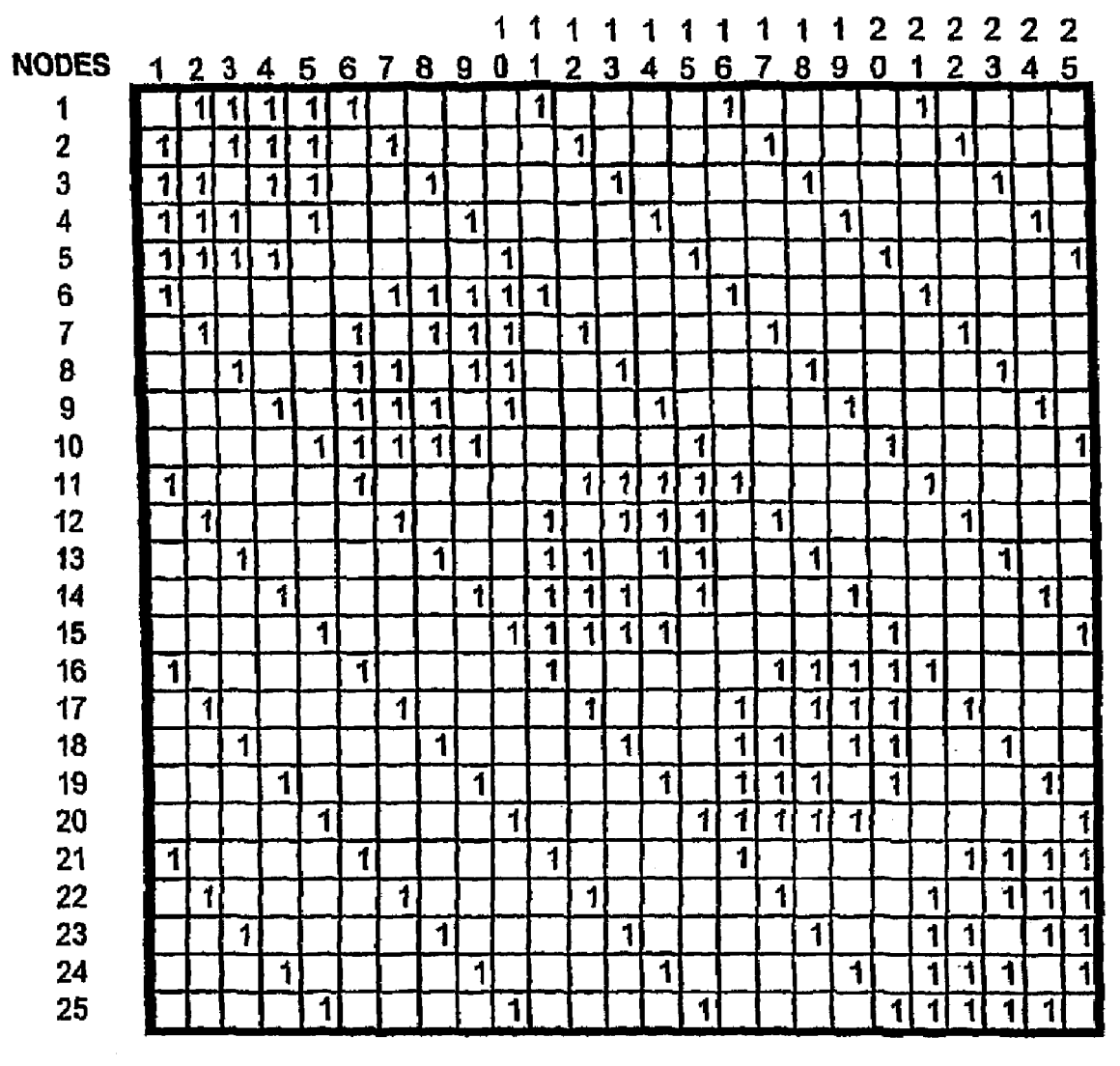

FIG. 15 shows the connection pattern for a (25, 8, 3, 2) SRG;

Figure 16:
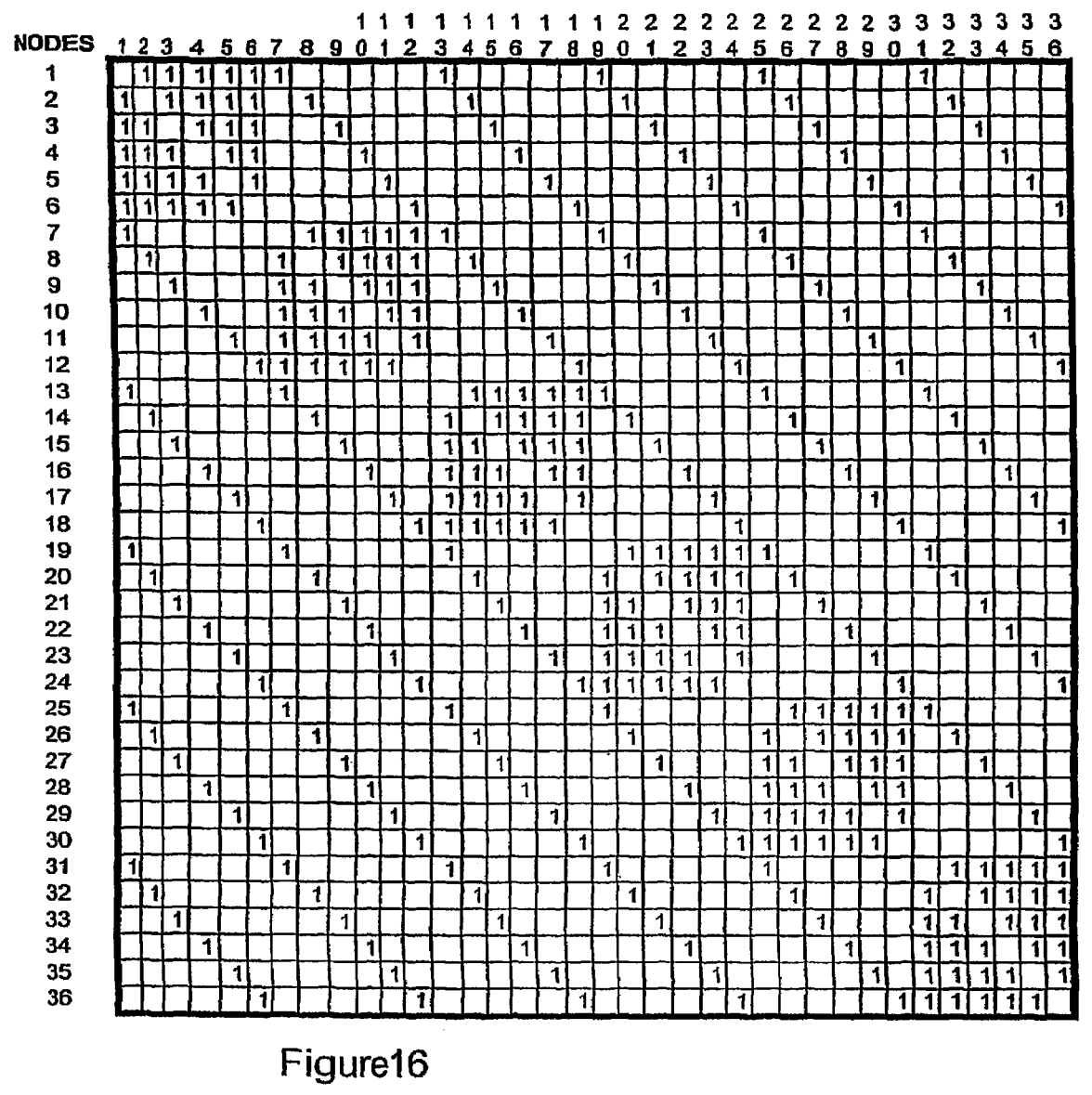

FIG. 16 shows the connection pattern for a (36, 10, 4, 2) SRG;

Figure 19:
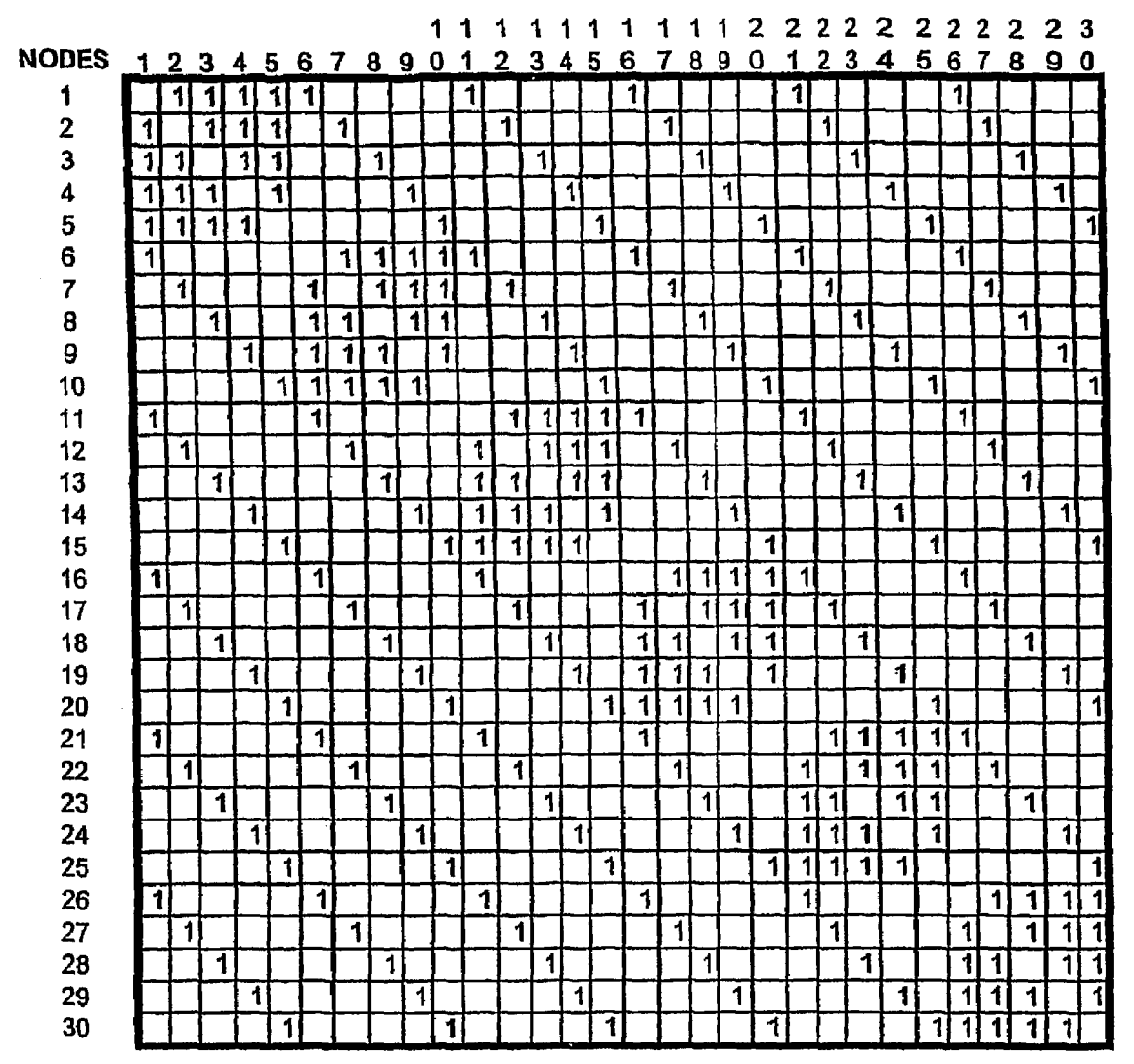

FIG. 19 shows the connection pattern for a 30 node extended (25, 8, 3, 2) SRG

Figure 20:
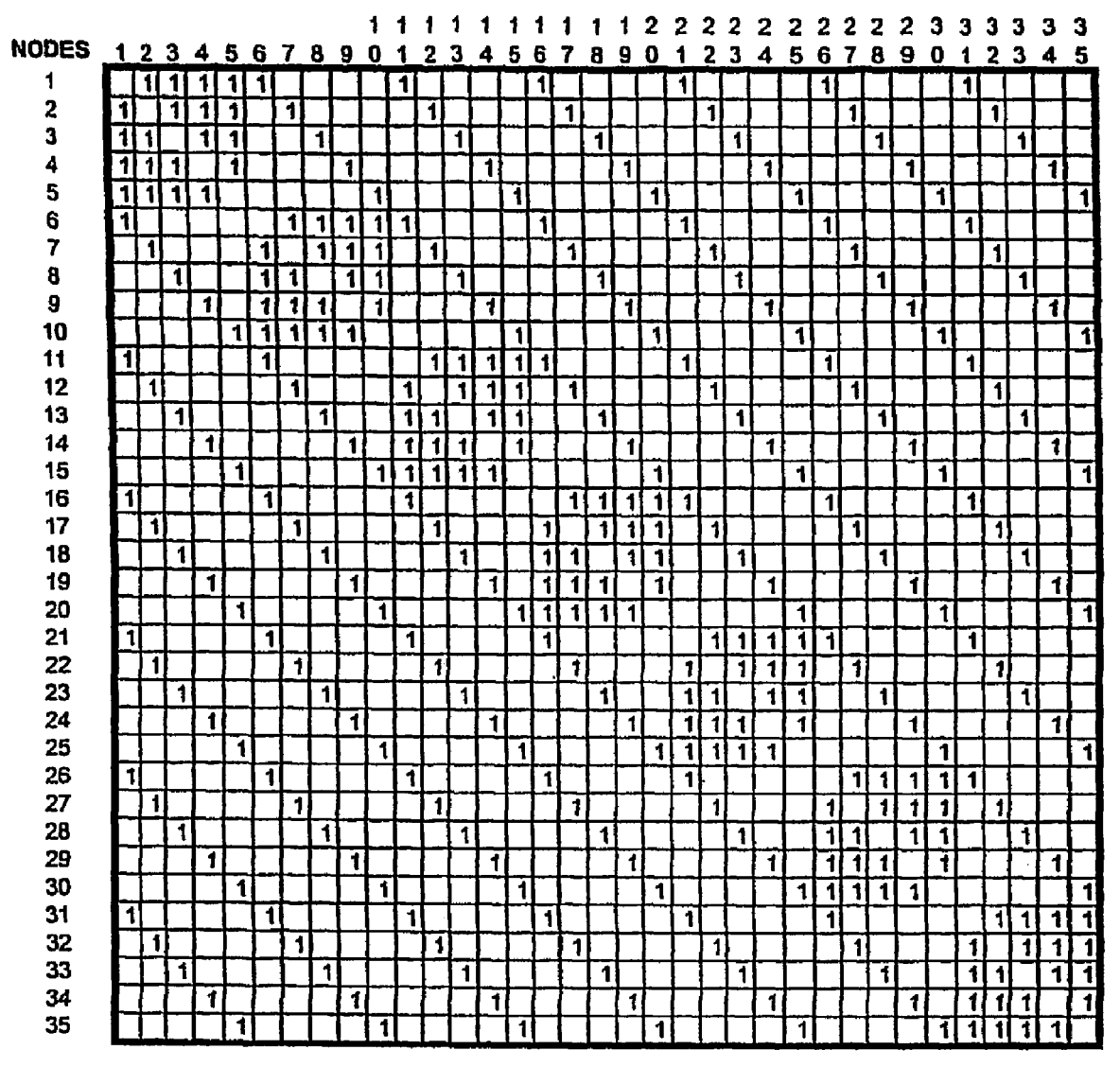

FIG. 20 shows the connection pattern for a 35 node extended (25, 8, 3, 2) SRG;

FIG. 21 shows the connection pattern for an (11, 5, 2) BIBD with a truncated diagonal;

Figure 22:
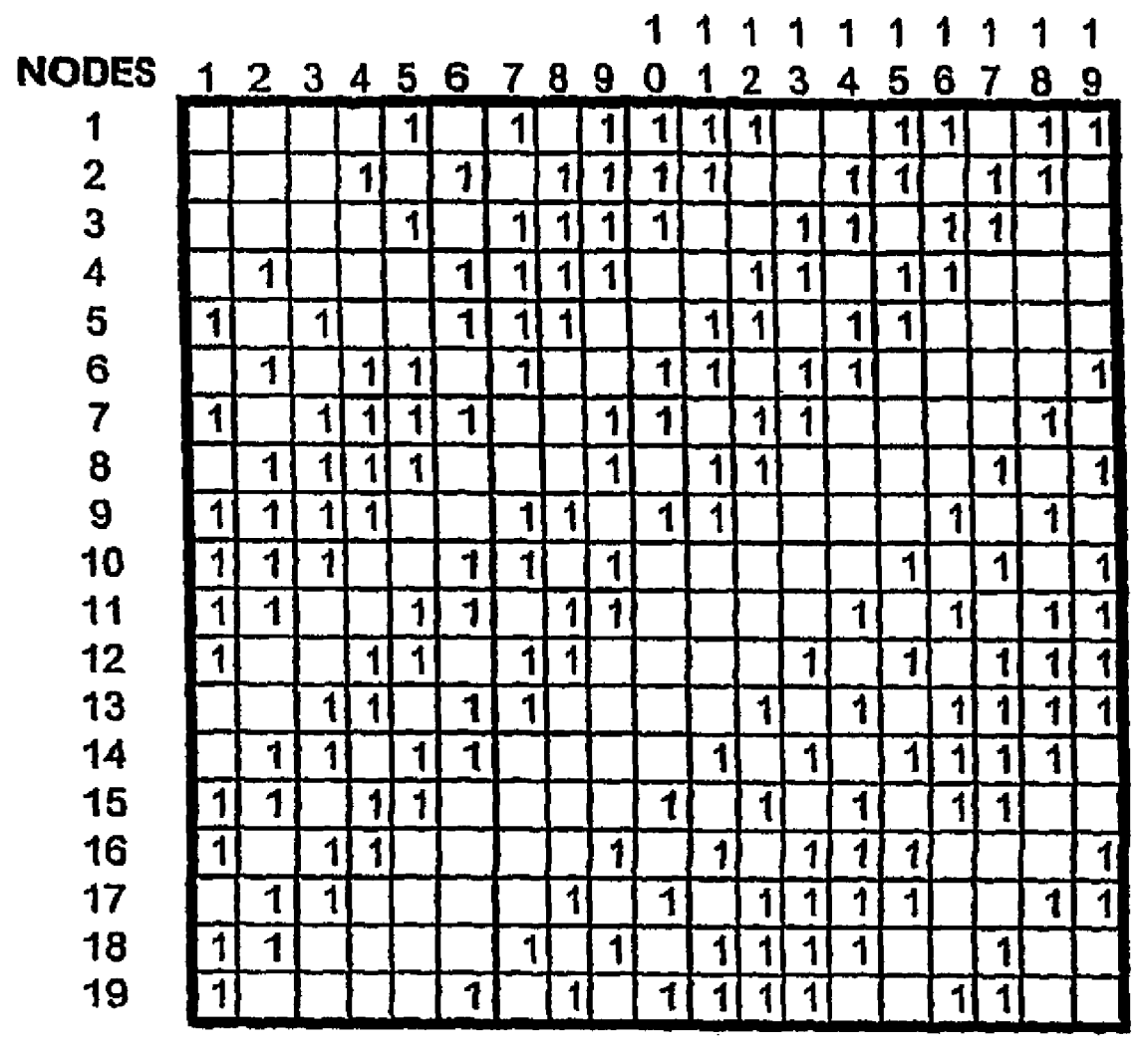

FIG. 22 shows the connection diagram for a (19, 10, 5) BIBD before truncating;

Figure 23:
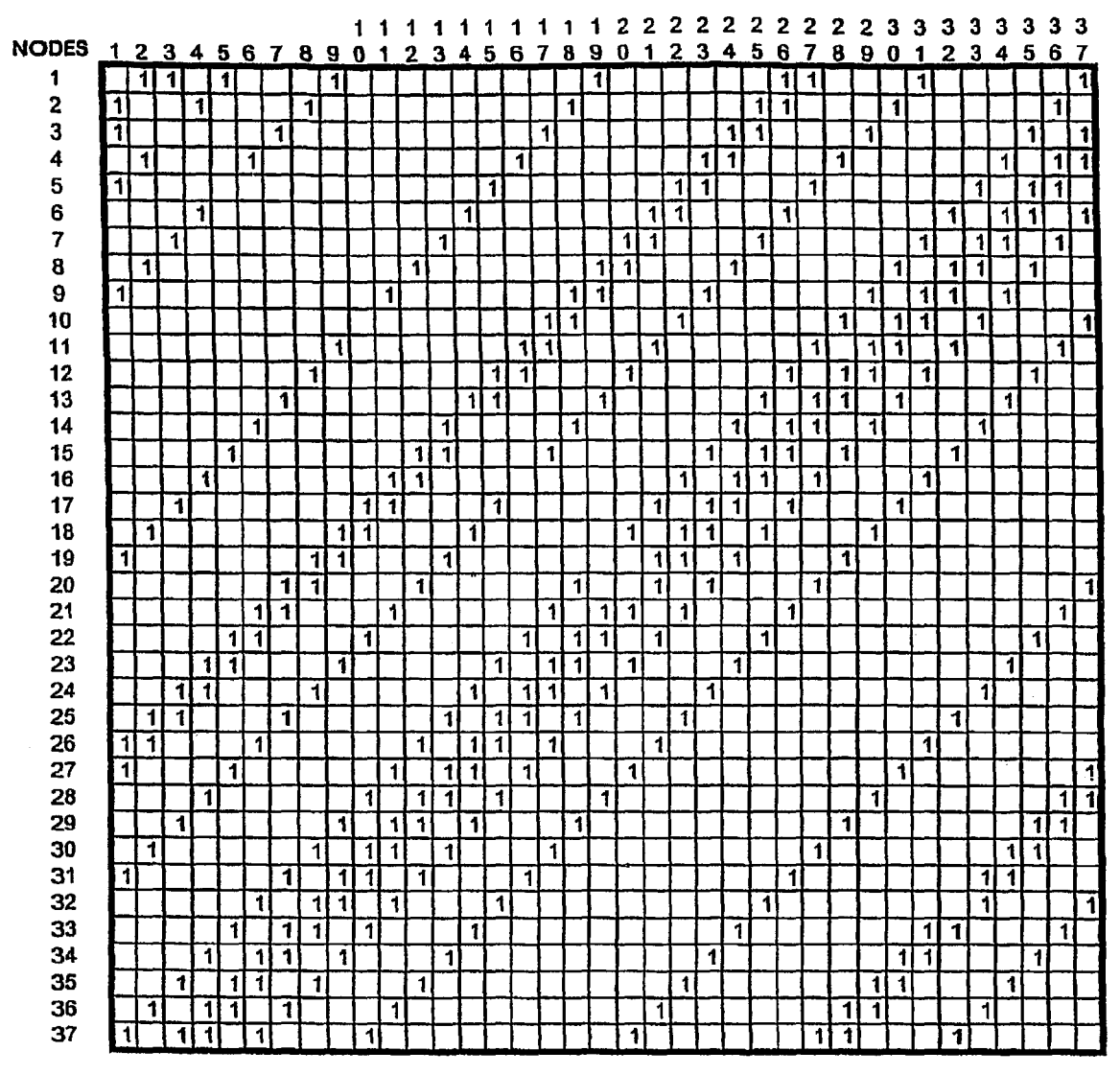

FIG. 23 shows the connection diagram for a (37, 9, 2) BIBD with a truncated diagonal;

Figure 24:
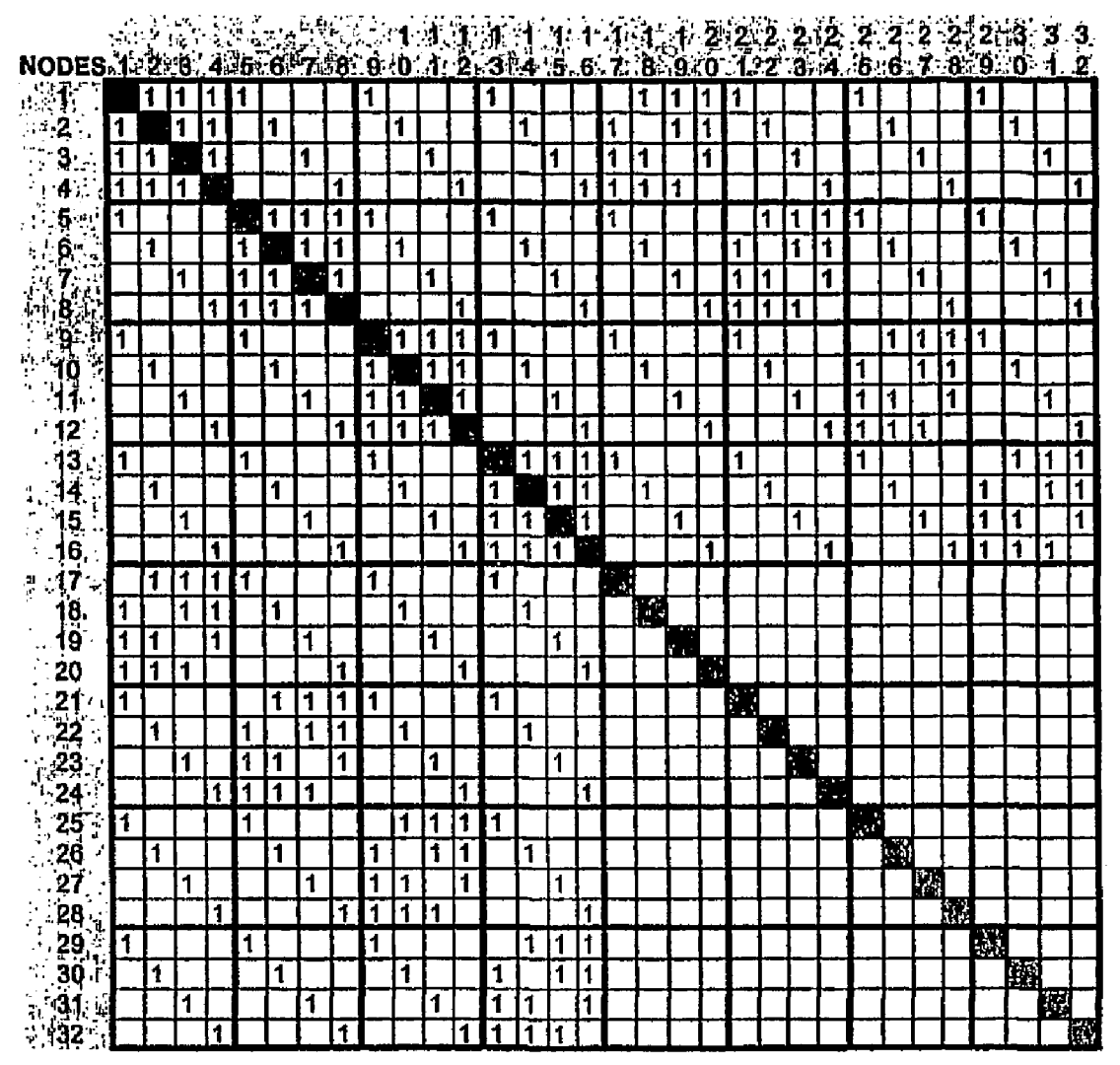

FIG. 24 shows a (16, 6, 2) BIBD (which is also a Strongly Regular Graph), forming a network of primary nodes, which has been extended by associating two secondary nodes with each primary node and connecting each secondary node to the same primary nodes as its associated secondary node;

Figure 26:
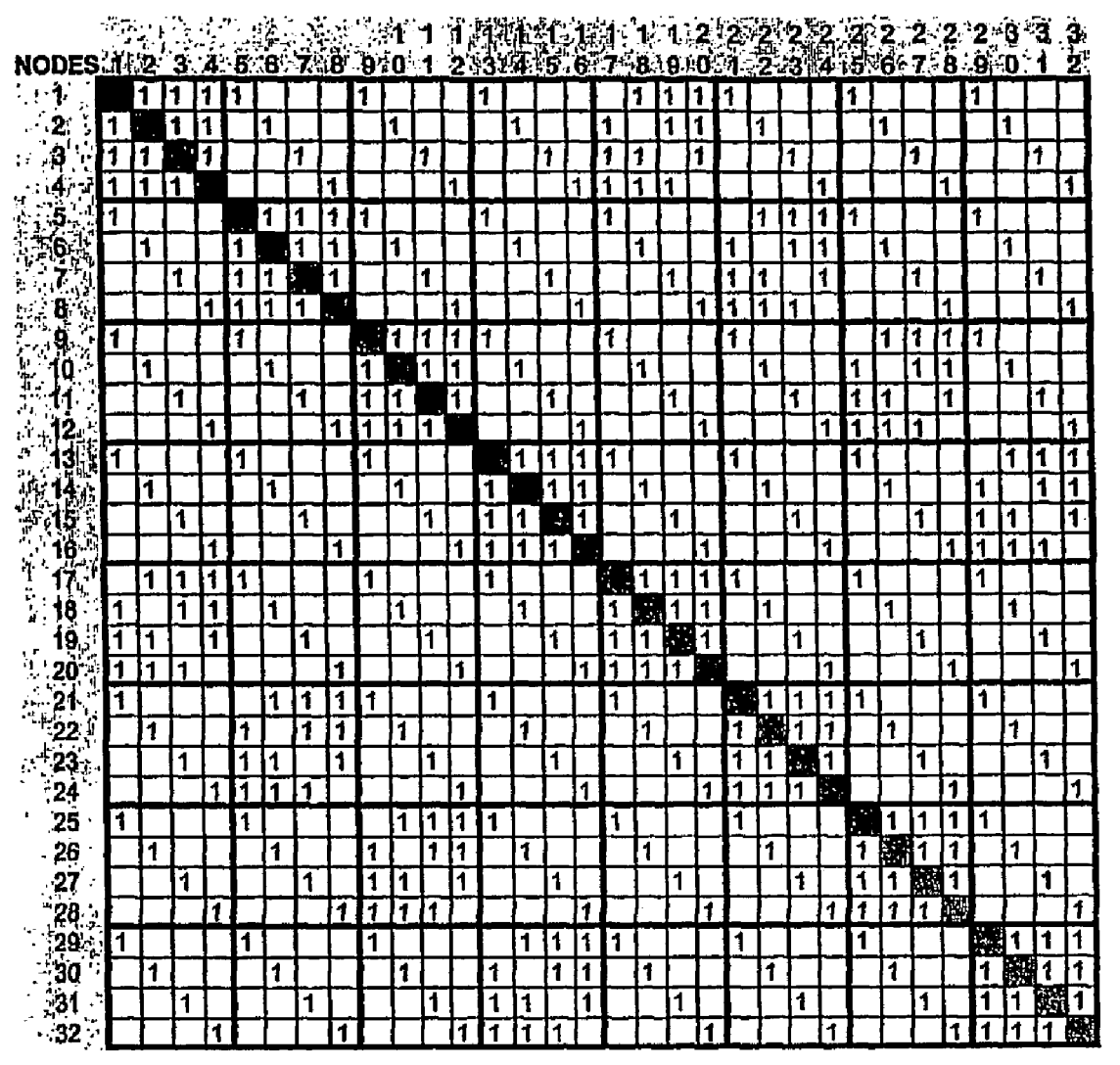

FIG. 26 shows a (16, 6, 2) BIBD (which is also a Strongly Regular Graph), forming a network of primary nodes, which has been extended by associating one secondary node with each primary node and connecting each secondary node to the to the same primary nodes as its associated secondary node; Secondary nodes are also connected if their associated primary nodes are connected;

Figure 27:
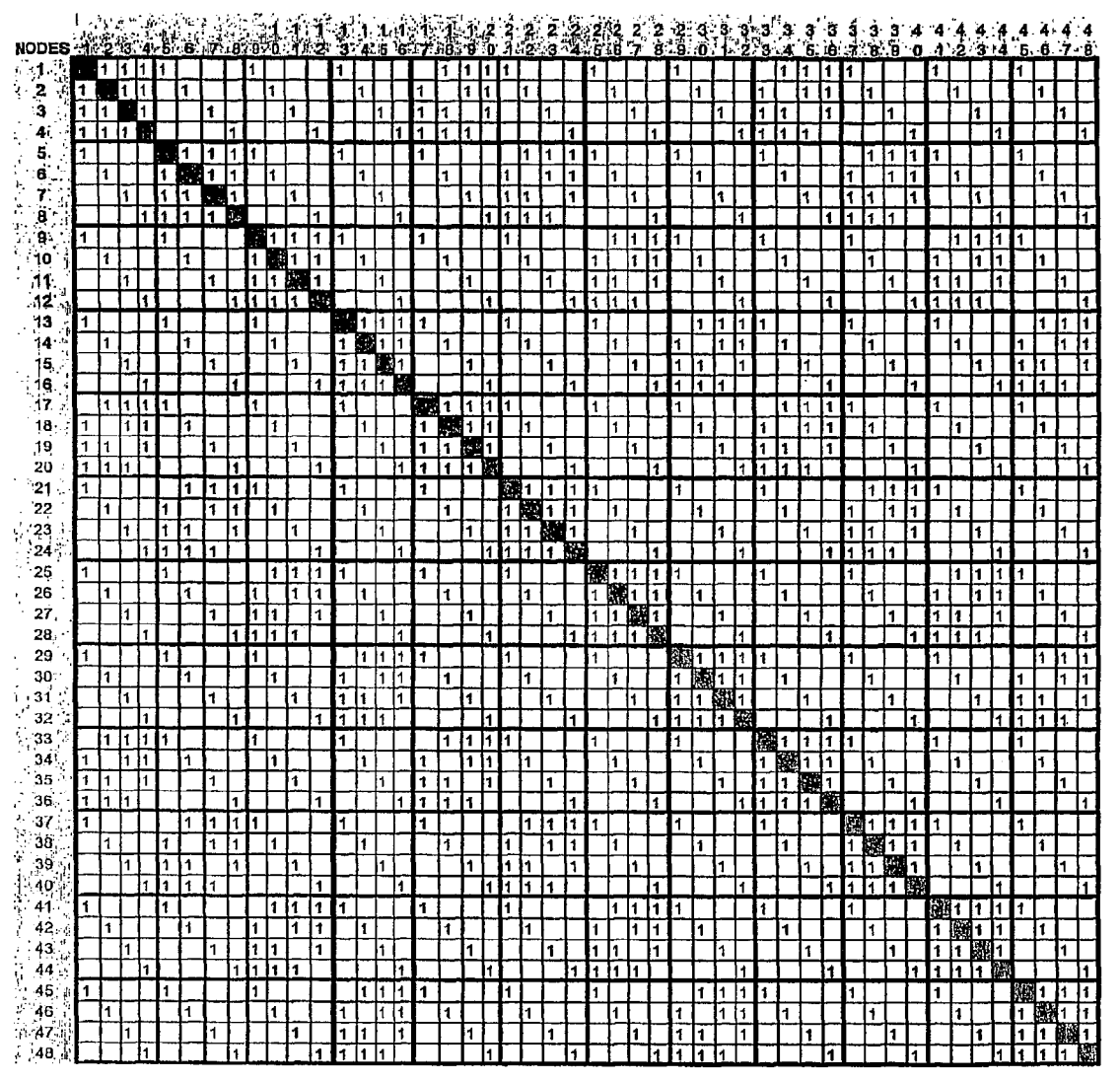

FIG. 27 shows a (16, 6, 2) BIBD (which is also a Strongly Regular Graph), forming a network of primary nodes, which has been extended by associating two secondary nodes with each primary node and connecting each secondary node to the same primary nodes as its associated secondary node; Secondary nodes are also connected if their associated primary nodes are connected.

DETAILED DESCRIPTION OF THE PREFERRED EMBODIMENTS

Figure 3:
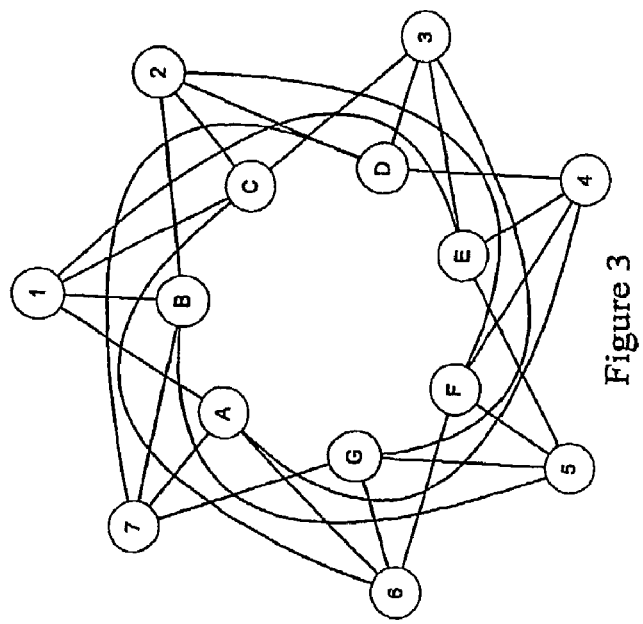
FIG. 3 shows a two tier application of a symmetric (7, 4, 2) design.
Figure 1A:
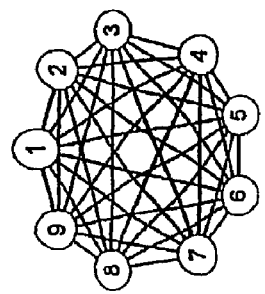
FIG. 1a shows a fully-meshed network with nine nodes.
Figure 1B:
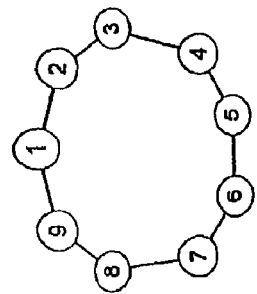
FIG. 1b shows a ring network with nine nodes.
Figure 2:
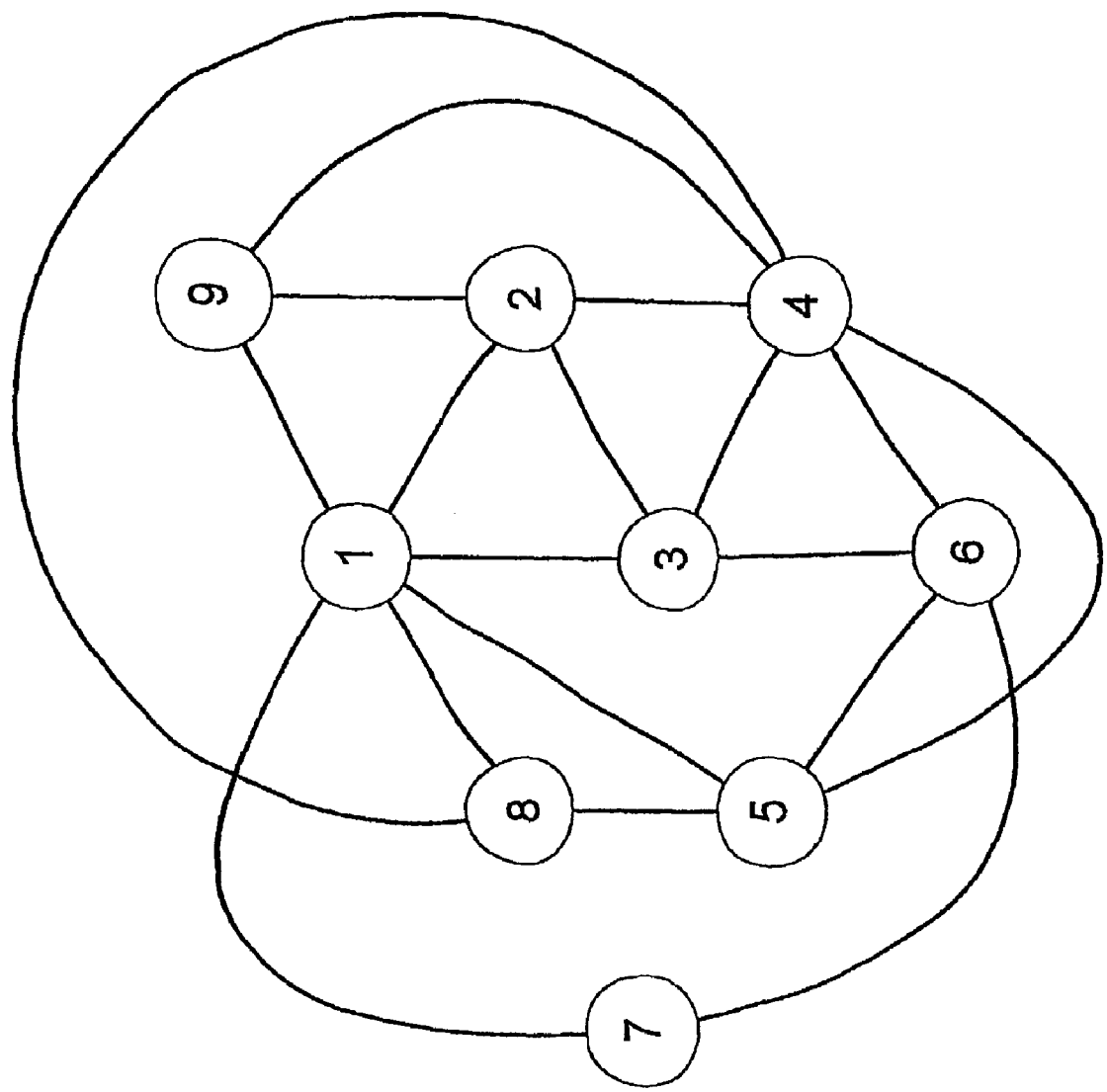
FIG. 2 shows a random partial mesh with nine nodes.
Figure 4:
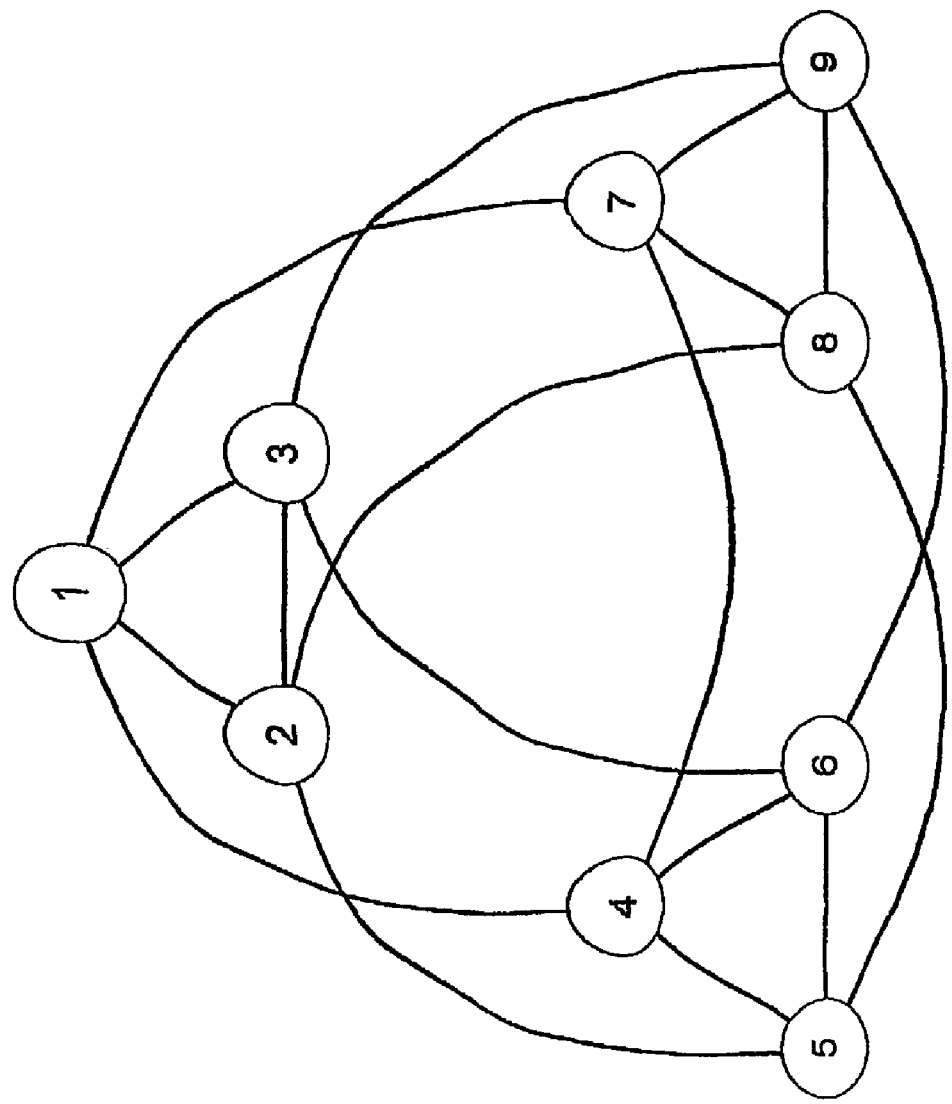
FIG. 4 shows a (9, 1, 4, 2) Strongly Regular Graph.
Figure 5B:
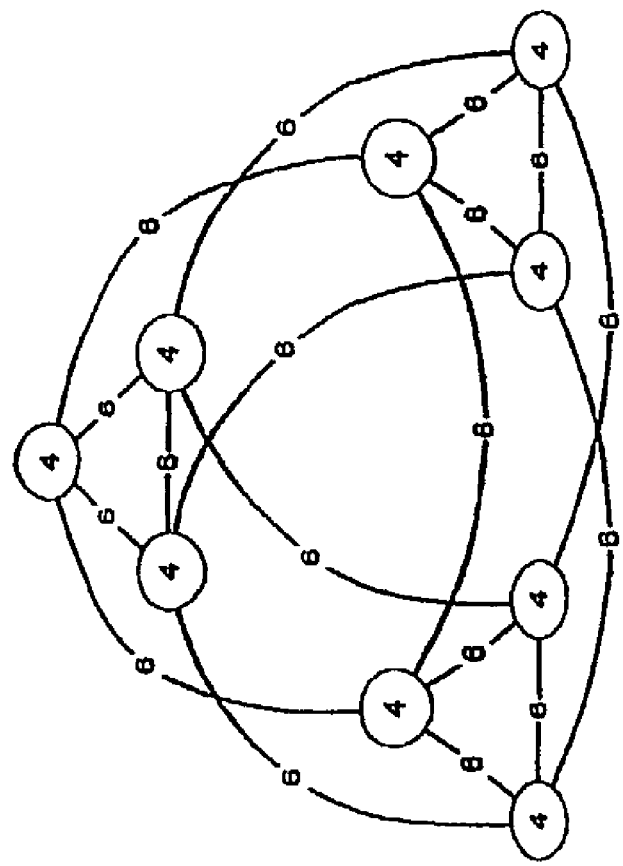
FIG. 5b shows transit traffic for a partially connected 9 node, 18 link network.
Figure 5A:
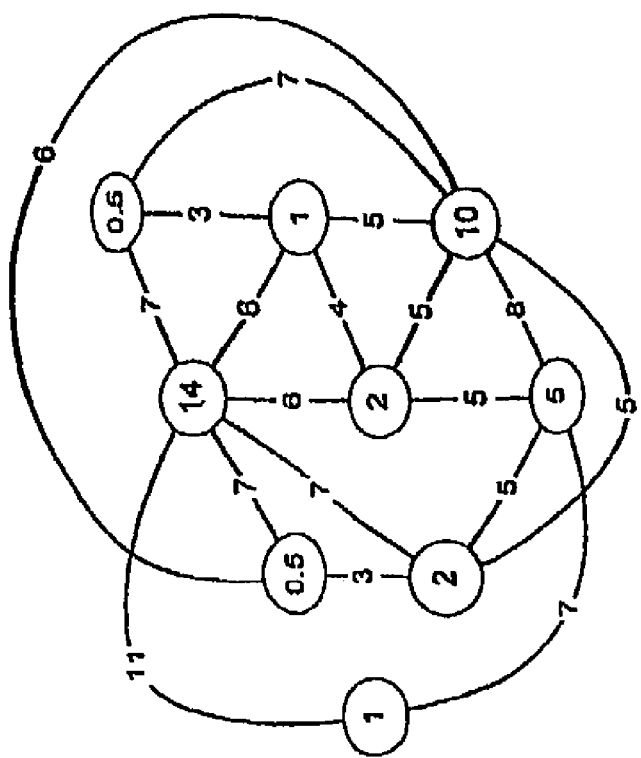
FIG. 5a shows transit traffic for a randomly meshed 9 node, 18 link network.
Figure 6:
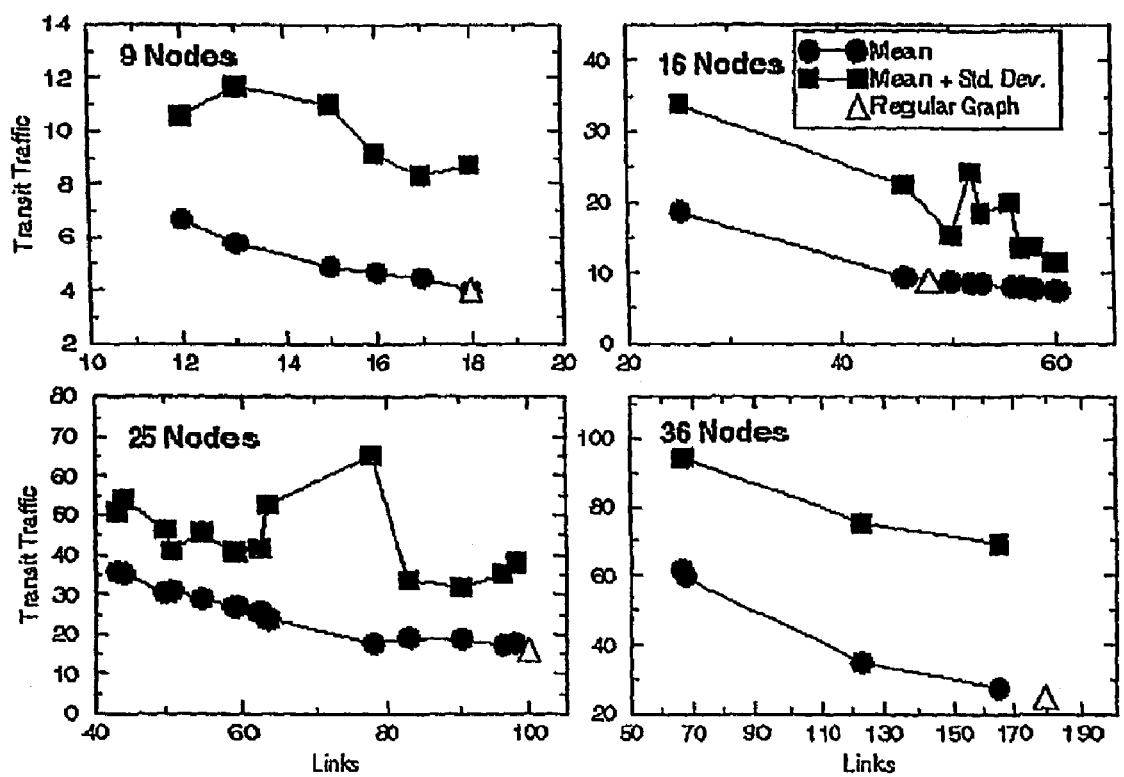
FIG. 6 shows the average transit traffic per node as a function of the number of links.
Figure 7B:
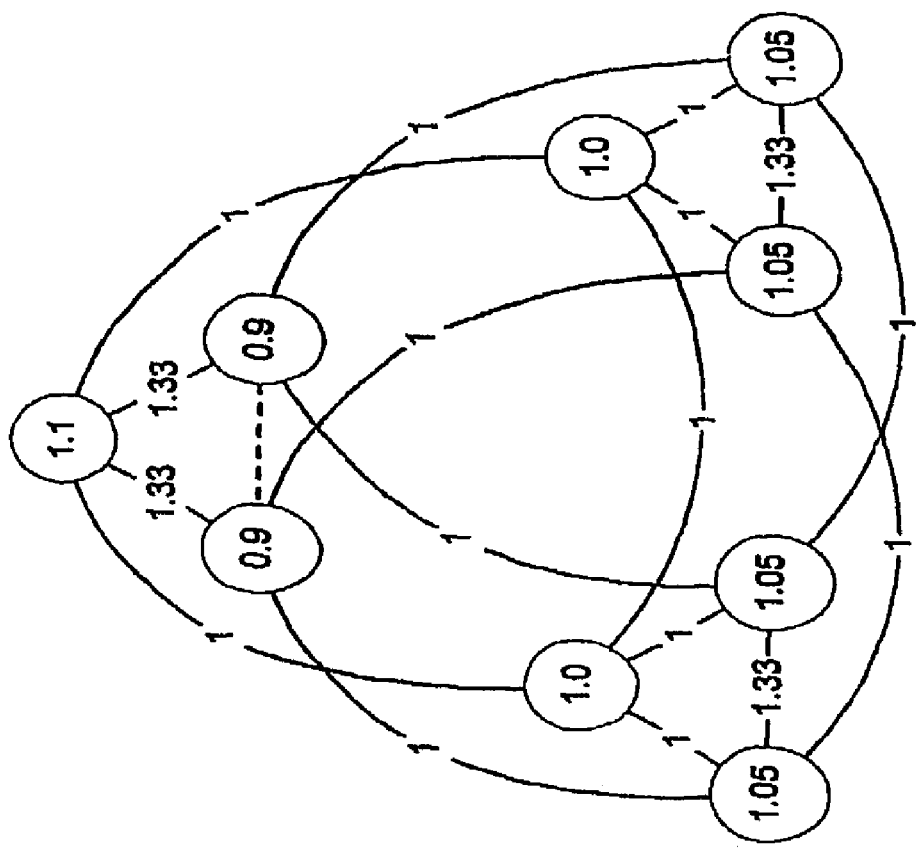
FIG. 7b shows the change in node and link loading upon link failure for a partially connected nine node network.
Figure 7A:
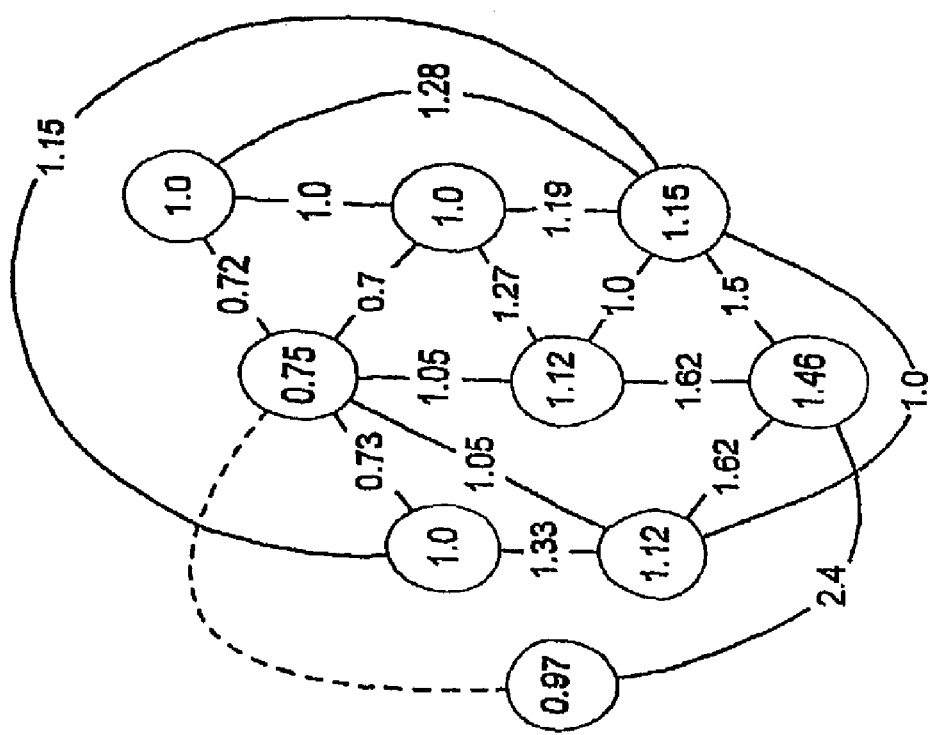
FIG. 7a shows the change in node and link loading upon link failure for a nine node random partial mesh network.
Figure 8:
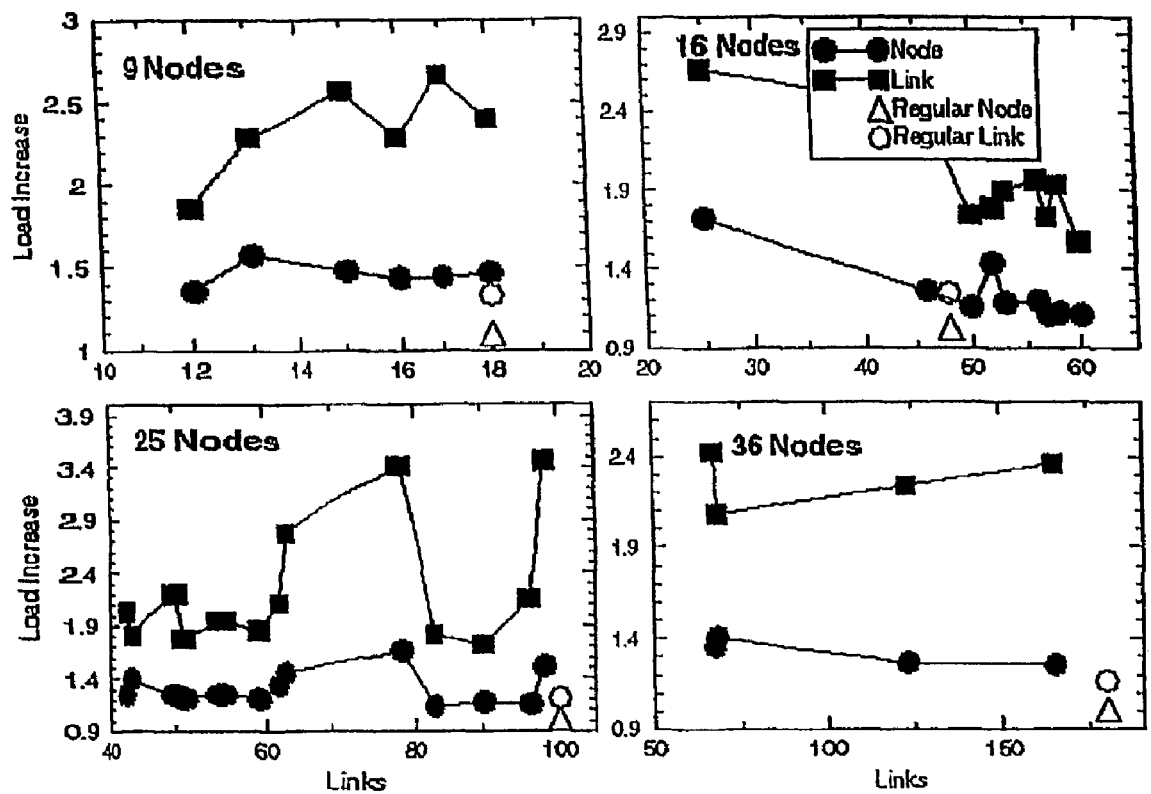
FIG. 8 shows the worst case increase in load for single failure of any node or link.
Figure 9:
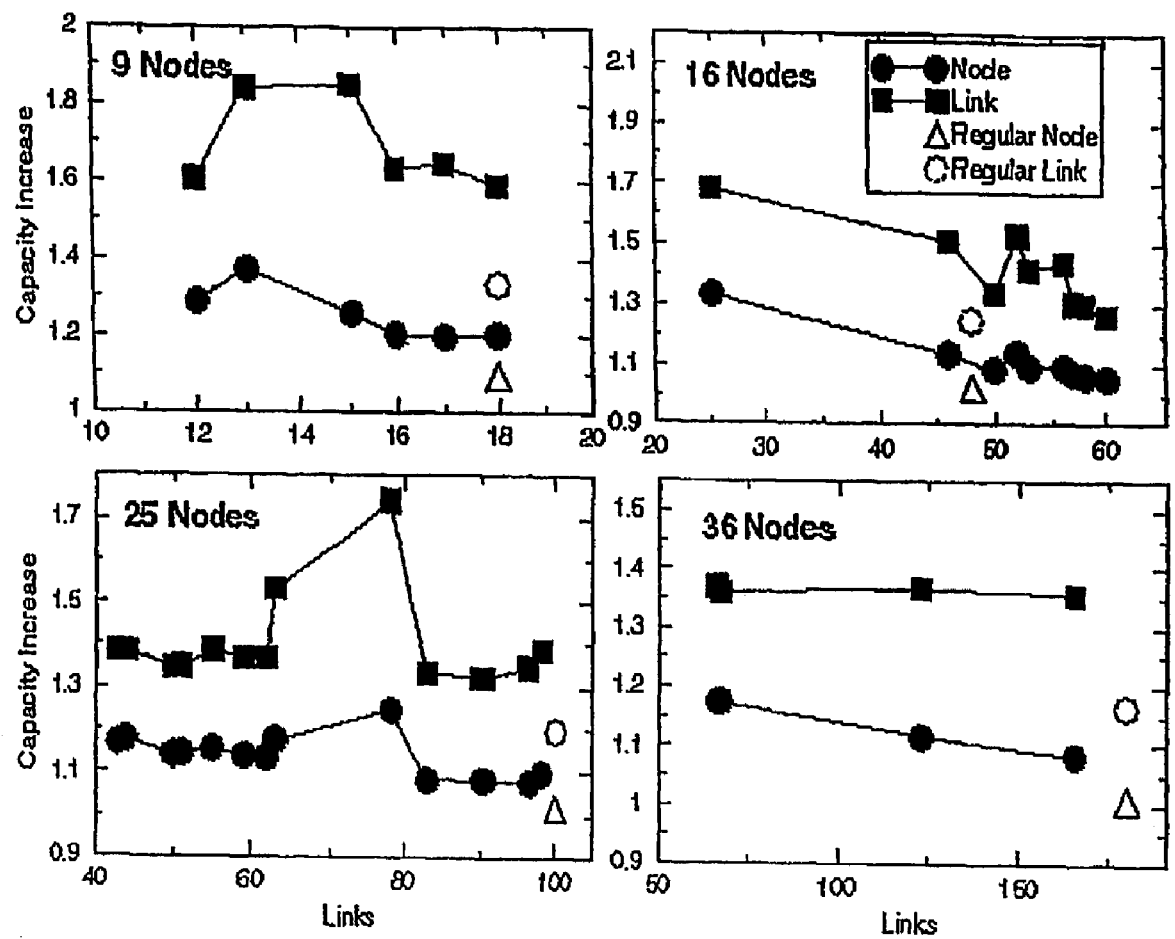
FIG. 9 shows the increase in capacity required to survive all single points of failure as a fraction of the capacity of the unfailed state.
Figure 10:
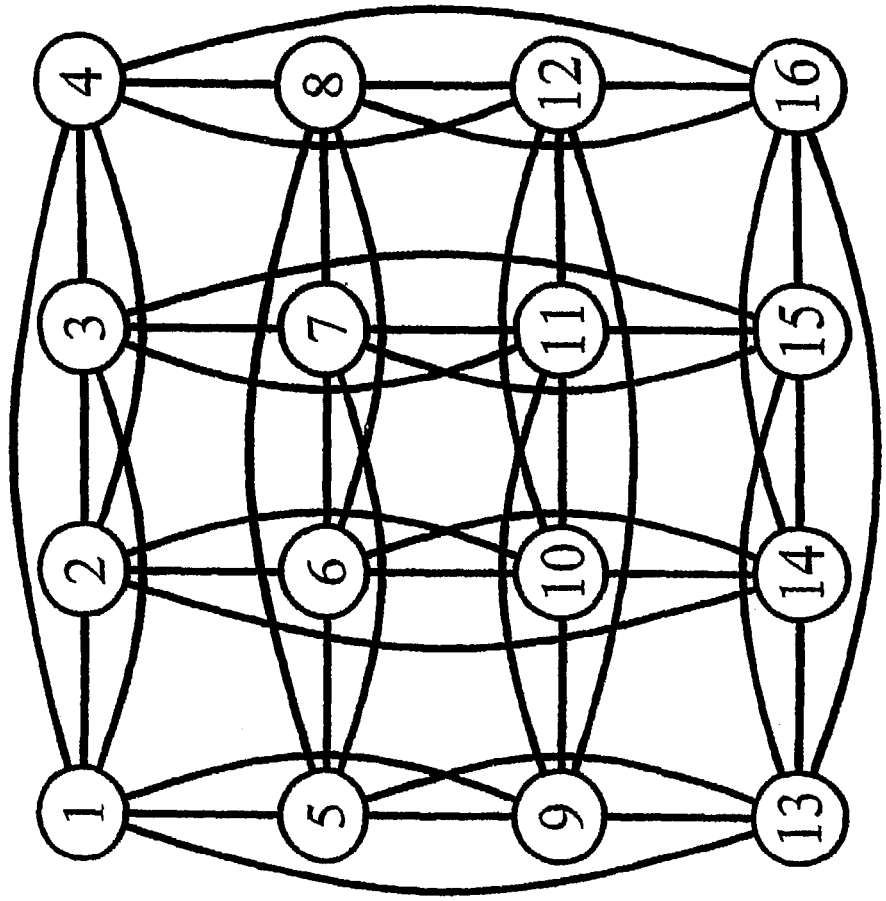
FIG. 10 shows a connection diagram for a 16 node BIBD with single-one link connections to 6 nodes and twin-two link connections to all nodes (16, 10, 2)
Figure 12:
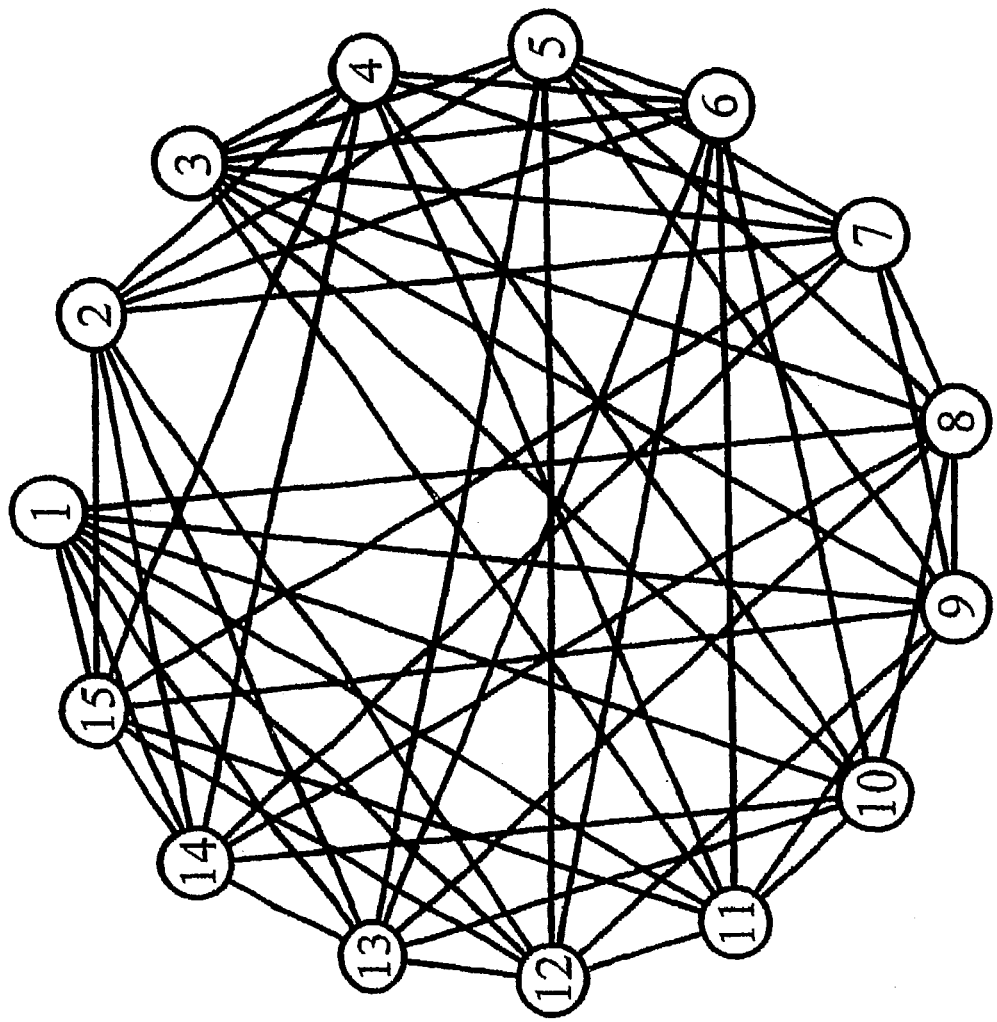
FIG. 12 shows a connection diagram for a 15 node BIBD with single-one link connections to 8 nodes and quad-two link connections to all nodes (15, 8, 4)
Figure 14:
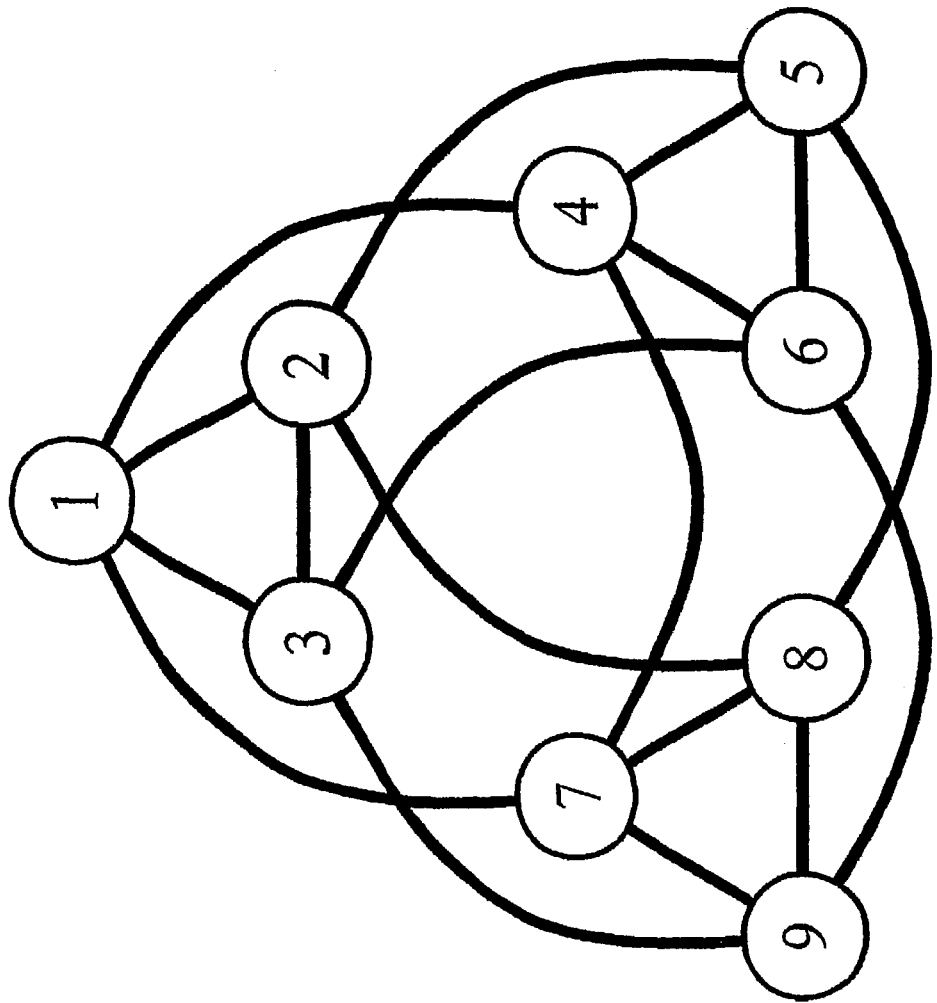
FIG. 14 shows a connection diagram for a 9 node BIBD with single-one link connections to 4 nodes and single-two link connections to the same 4 nodes and twin-two link connections to the other 4 nodes.
Figure 17:
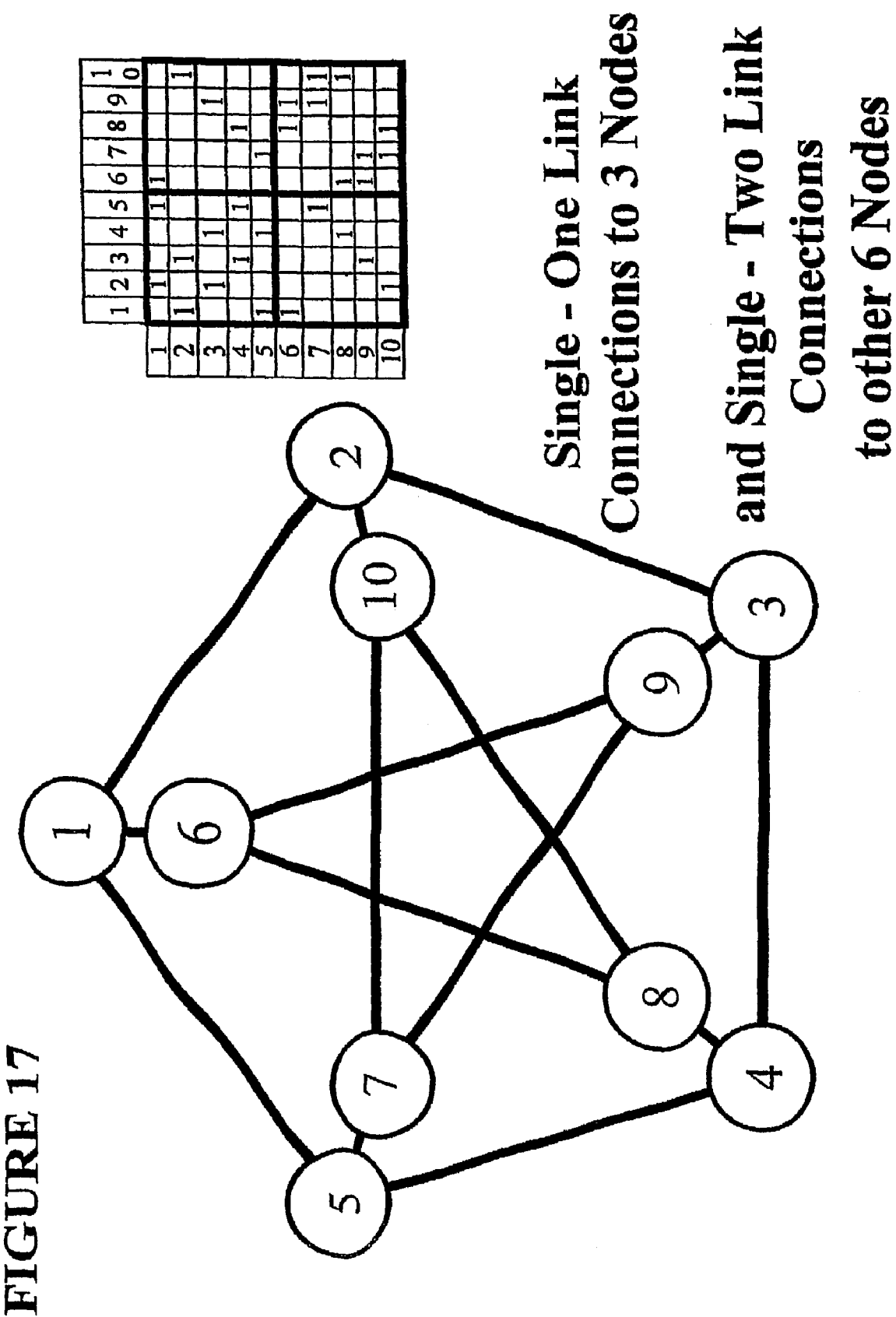
FIG. 17 shows a connection diagram for a 10 node BIBD with single-one link connections to 3 nodes and single-two link connections to the other 6 nodes.
Figure 18:
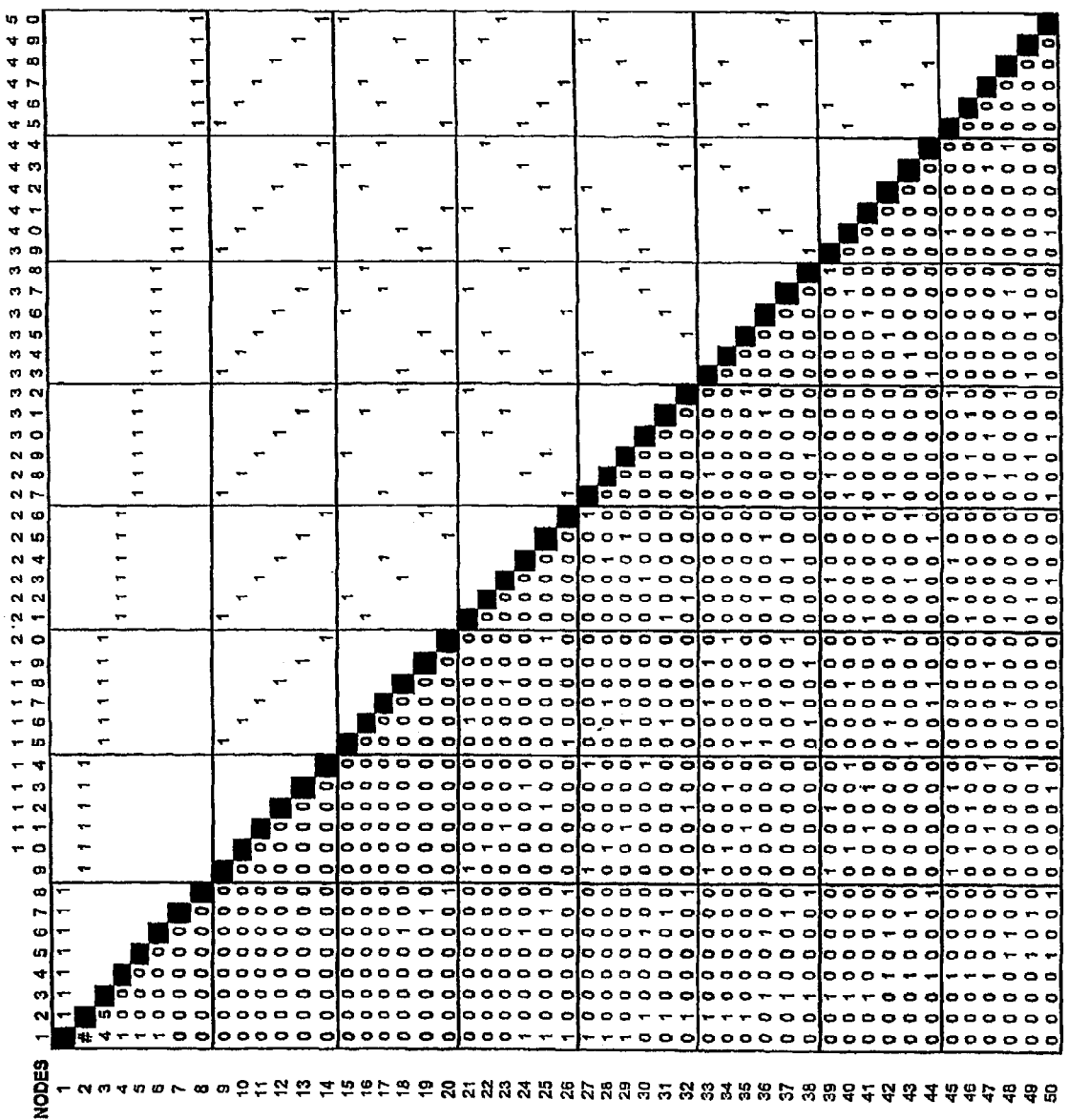
FIG. 18 shows the connection pattern for a (50, 7, 0, 1) SRG
Figure 25:
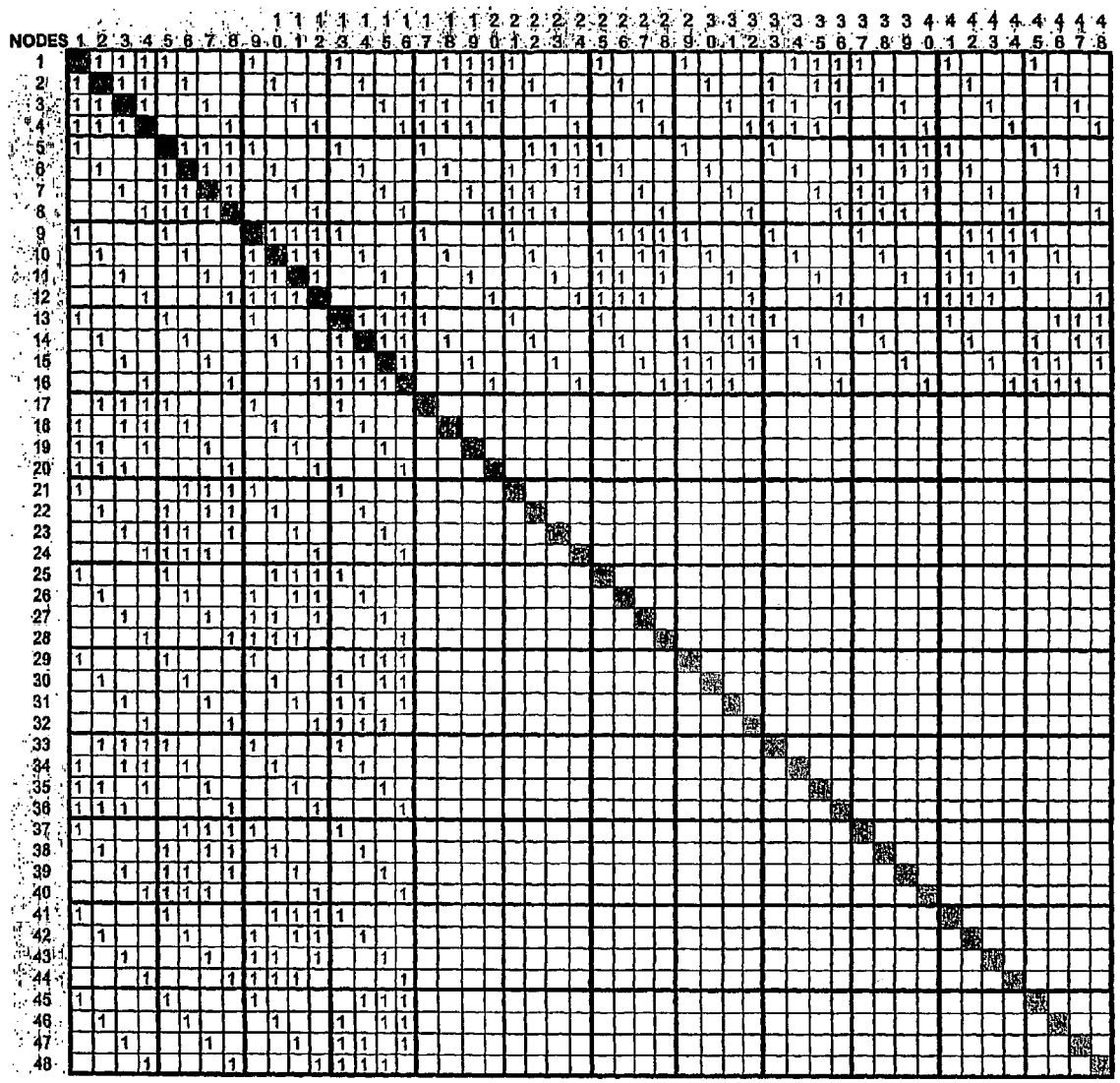
FIG. 25 shows a (16, 6, 2) BIBD (which is also a Strongly Regular Graph), forming a network of primary nodes which has been extended by associating two secondary nodes with each primary node and connecting each secondary node to the same primary nodes as its associated secondary node.

BIBD's can be used in networks in the following ways:

1. Complete Networks:

The simplest case: if the BIBD has a square, symmetric, incidence matrix (v=b), then it can be used as the network connectivity matrix C. Every Node in the network will have λ Routes of Length 2 to all other Nodes. It will also have Routes of Length 1 to some Nodes.

2. Two Level Networks:

Any block design can be used in a two level network, where the total number of Nodes (N=v+b) can be broken down into two categories of Node, v of one type, b of another (the two sets of Nodes might represent Trunk and Local exchanges in a PSTN, for example), where the desirable connectivity properties are required between the subset of v Nodes. (If the BIDB has a square symmetric incidence matrix, then $A^T A = A A^T$, and the desired connectivity properties hold between all Nodes). The v times b incidence matrix A of the N times N connectivity matrix is incorporated as follows:

$$C = \begin{pmatrix} 0 & \cdot & \cdot & 0 & \cdot & \cdot & \cdot & \cdot & \cdot \\ \cdot & (b \times b) & \cdot & \cdot & \cdot & A^T & \cdot \\ \cdot & \cdot & \cdot & \cdot & (b \times v) & \cdot \\ 0 & \cdot & \cdot & 0 & \cdot & \cdot & \cdot & \cdot \\ \cdot & \cdot & \cdot & 0 & \cdot & \cdot & \cdot & 0 \\ \cdot & \cdot & \cdot & \cdot & \cdot & \cdot \\ \cdot & A & \cdot & \cdot & (v \times v) & \cdot \\ \cdot & (v \times b) & \cdot & \cdot & \cdot & \cdot \\ \cdot & \cdot & \cdot & 0 & \cdot & \cdot & \cdot & 0 \end{pmatrix}$$

The matrix B that gives the number of Routes of Length 2 is then $$B = \begin{pmatrix} \cdot & \cdot & \cdot & \cdot & 0 & \cdot & \cdot & \cdot & 0 \\ \cdot & A^T A & \cdot & \cdot & \cdot & \cdot \\ \cdot & (b \times b) & \cdot & \cdot & (b \times v) & \cdot \\ \cdot & \cdot & \cdot & 0 & \cdot & \cdot & \cdot & 0 \\ 0 & \cdot & \cdot & 0 & \cdot & \cdot & \cdot & \cdot \\ \cdot & \cdot & \cdot & \cdot & \cdot & \cdot \\ \cdot & \cdot & \cdot & AA^T & \cdot \\ \cdot & (v \times b) & \cdot & \cdot & (v \times v) & \cdot \\ 0 & \cdot & \cdot & 0 & \cdot & \cdot & \cdot & \cdot \end{pmatrix}$$

and the desired connectivity (the $AA^T$) has been achieved between the subset of v Nodes as required.

3. Embedded Sub-Networks:

A v times b block design can be embedded as an arbitrary sub-network, as above, to provide v Nodes with the desired A Routes of Length 2 between different sub-group Nodes. If the BIDB has a square symmetric incidence matrix, then $A^T A = AA^T$, and the desired connectivity properties hold between all v+b. Nodes of the sub-network.

$$C = \begin{pmatrix} 0 & \cdot & \cdot & 0 & \cdot & \cdot & \cdot & \cdot & \cdot \\ \cdot & \cdot & \cdot & \cdot & \cdot & A^T & \cdot \\ \cdot & (b \times b) & \cdot & \cdot & (b \times v) & \cdot \\ 0 & \cdot & \cdot & 0 & \cdot & \cdot & \cdot & \cdot \\ \cdot & \cdot & \cdot & 0 & \cdot & \cdot & \cdot & 0 \\ \cdot & \cdot & \cdot & \cdot & \cdot & \cdot \\ \cdot & A & \cdot & \cdot & \cdot & \cdot \\ \cdot & (v \times b) & \cdot & \cdot & (v \times v) & \cdot \\ \cdot & \cdot & \cdot & 0 & \cdot & \cdot & \cdot & 0 \end{pmatrix}$$

Hence the matrix of Routes of Length 2 will be $$B = \begin{pmatrix} \cdot & \cdot & \cdot & \cdot & 0 & \cdot & \cdot & \cdot & 0 \\ \cdot & AA & \cdot & \cdot & \cdot & \cdot \\ \cdot & (b \times b) & \cdot & \cdot & (b \times v) & \cdot \\ \cdot & \cdot & \cdot & 0 & \cdot & \cdot & \cdot & 0 \\ 0 & \cdot & \cdot & 0 & \cdot & \cdot & \cdot & \cdot \\ \cdot & \cdot & \cdot & \cdot & \cdot & \cdot \\ \cdot & \cdot & \cdot & AA & \cdot \\ \cdot & (v \times b) & \cdot & \cdot & (v \times v) & \cdot \\ 0 & \cdot & \cdot & 0 & \cdot & \cdot & \cdot & \cdot \end{pmatrix}$$

REFERENCES

[1] 'Combinatorial Theory', M. Hall, Jr., Blaisdell (Waltham Mass.) 1967
[2] 'The CRC Handbook of Combinatorial Designs', C. J. Colboum and J. H. Dinitz (Eds), CRC Press (Boca Raton, Fla.) 1996
[3] Patent Application No. GB 9912290.5.
[4] NetsceneSP, a network planning and design tool which employs simulated annealing, produced by The Network Design House, London.
[5] 'OSPF Version 2', John T. Moy, RFC2328. See also OSPF, John T. Moy, Addison Wesley Longman (Reading, Mass., USA, 1998)

The invention claimed is:

1. A partially interconnected topological network, comprising:
   at least six topological nodes, wherein a topological node is a single physical node or a group of interconnected physical node' or part of a physical node or a group of interconnected physical nodes and parts of physical nodes,
   each topological node having at least three point-to-point topological links connecting it to some, but not all, of the at least six topological nodes,
   wherein P groups of Q topological nodes are arranged so that each topological node within a group is connected to every other topological node within that group and to exactly one topological node in every other of the P-1 groups, where P and Q are great than two, and where P is not equal to Q, and
   where there is at least one choice of routing between any two topological nodes, and where said at least one choice of routing further comprises either two point-to-point topological links connected in series at another of the topological nodes or a direct point-to-point topological link between the two topological nodes.

2. The partially interconnected topological network as claimed in claim 1, wherein each topological node is a traffic entry point and/or a traffic exit point.

3. The partially interconnected topological network as claimed in claim 1, wherein the partially interconnected topological network is a part of a larger topological network.

4. The partially interconnected topological network as claimed in claim 1, wherein each point-to-point topological link comprises a whole or a part of a transmission system or several transmission systems connected in series or in parallel.

5. The partially interconnected topological network as claimed in claim 4, wherein the transmission system carries multiple circuits.

6. The partially interconnected topological network as claimed in claim 1, wherein there is an equal number of point-to-point topological links from each topological node.

7. The partially interconnected topological network as claimed in claim 1, wherein the topological network is arranged by an application of symmetric balanced incomplete block designs, in which for every point-to-point topological link between two nodes A and B there is a corresponding point-to-point topological link between nodes B and A, and in which no topological node is connected to itself by an external loop.

8. The partially interconnected topological network as claimed in claim 7, wherein there are missing topological links.

9. The partially interconnected topological network as claimed in claim 1, wherein the topological network is arranged by an application of strongly regular graphs.

10. The partially interconnected topological network as claimed in claim 1, wherein the topological network is arranged by an application of symmetric balanced incomplete block designs which for every point-to-point topological link between two nodes A and B there is a corresponding point-to-point topological link between nodes B and A, and in which any external loops connecting a topological node to itself are deleted.

11. The partially interconnected topological network as claimed in claim 1, wherein the network is connected to a further similar partially interconnected topological network having an equal or lesser number of topological nodes.

12. The partially interconnected topological network as claimed in claim 1, where no topological node is connected to itself by an external loop.

13. The partially interconnected topological network as claimed in claim 1, wherein:

$$(\text{topological nodes}-1) \times \text{choices} = (\text{point-to-point topological links})^2.$$

14. The partially interconnected topological network as claimed in claim 1, wherein the partially interconnected topological network is a telecommunications and/or data network.

15. The partially interconnected topological network as claimed in claim 1, wherein a group of primary nodes arranged by an application of strongly regular graphs is extended by associating one or more secondary nodes with each primary node, wherein each secondary node is connected to the same primary nodes as its associated primary node.

16. The partially interconnected topological network as claimed in claim 15, wherein two secondary nodes are connected if their associated primary nodes are connected.

* * * * *